US009565241B2

(12) United States Patent
Kim et al.

(10) Patent No.: US 9,565,241 B2
(45) Date of Patent: Feb. 7, 2017

(54) CONTROL METHOD AND CONTROL APPARATUS FOR APPARATUS INCLUDING SHORT RANGE WIRELESS COMMUNICATION MODULE

(71) Applicant: SAMSUNG ELECTRONICS CO., LTD., Suwon-si (KR)

(72) Inventors: Hyun-young Kim, Seoul (KR); Hee-won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/646,107

(22) Filed: Oct. 5, 2012

(65) Prior Publication Data

US 2014/0057565 A1    Feb. 27, 2014

(30) Foreign Application Priority Data

Aug. 24, 2012 (KR) .................. 10-2012-0093248

(51) Int. Cl.
  *H04B 7/26* (2006.01)
  *H04L 29/08* (2006.01)
  (Continued)

(52) U.S. Cl.
  CPC .............. *H04L 67/06* (2013.01); *G06F 3/1454* (2013.01); *H04L 67/1095* (2013.01);
  (Continued)

(58) Field of Classification Search
  CPC .... G06F 3/1454; H04L 67/06; H04L 67/1095; H04L 67/14; H04L 67/36; H04M 3/567; H04W 4/008; H04W 4/023
  (Continued)

(56) References Cited

U.S. PATENT DOCUMENTS 6,414,635 B1  7/2002  Stewart et al.
7,289,813 B2  10/2007  Karaoguz
(Continued)

FOREIGN PATENT DOCUMENTS

CA    2495014 A1    2/2004
CN  102594981 A     7/2012
(Continued)

OTHER PUBLICATIONS

International Search Report, dated Dec. 26, 2013, issued by the International Searching Authority in counterpart International Application No. PCT/KR2013/007604.
(Continued)

*Primary Examiner* — Thanh Le
(74) *Attorney, Agent, or Firm* — Sughrue Mion, PLLC

(57) ABSTRACT

A control method and control apparatus for determining a relative location of a mobile terminal with respect to a display apparatus by using short range wireless communication. A method of controlling a display apparatus including a plurality of short range wireless communication modules, the method includes: performing short range wireless communication with a mobile terminal through a short range wireless communication module included in the display apparatus; identifying the short range wireless communication module performing the short range wireless communication with the mobile terminal from among the plurality of short range wireless communication modules; determining a relative location of the mobile terminal with respect to the display apparatus according to the result of identifying; and determining a location on a screen of the display apparatus to display data according to the relative location and displaying the data on the screen of the display apparatus according to the determined location.

56 Claims, 18 Drawing Sheets

(51) Int. Cl.
*G06F 3/14* (2006.01)
*H04M 3/56* (2006.01)
*H04W 4/00* (2009.01)
*H04W 4/02* (2009.01)

(52) U.S. Cl.
CPC .............. *H04L 67/14* (2013.01); *H04L 67/36* (2013.01); *H04M 3/567* (2013.01); *H04W 4/008* (2013.01); *H04W 4/023* (2013.01); *H04W 4/026* (2013.01)

(58) Field of Classification Search
USPC ........ 455/41.1, 41.2, 67.11, 550.1, 567, 569, 455/575.1, 456.1, 457, 566; 340/539.1, 340/539.23, 825.49; 345/169, 172, 173, 345/174
See application file for complete search history.

(56) References Cited

U.S. PATENT DOCUMENTS

| | | |
|---|---|---|
| 8,063,888 B2 | 11/2011 | McFarlane et al. |
| 8,789,131 B2* | 7/2014 | Choi et al. .................... 725/148 |
| 9,270,803 B2 | 2/2016 | Qing et al. |
| 2004/0203352 A1 | 10/2004 | Hall et al. |
| 2006/0052112 A1 | 3/2006 | Baussi et al. |
| 2008/0266083 A1 | 10/2008 | Midholt et al. |
| 2009/0270093 A1 | 10/2009 | Lee |
| 2010/0141437 A1* | 6/2010 | Karam et al. ............ 340/539.23 |
| 2011/0037712 A1 | 2/2011 | Kim et al. |
| 2011/0081923 A1 | 4/2011 | Forutanpour et al. |
| 2011/0163939 A1 | 7/2011 | Tam et al. |
| 2014/0080416 A1* | 3/2014 | Seo et al. .................... 455/41.2 |
| 2014/0106677 A1* | 4/2014 | Altman ........................ 455/41.2 |

FOREIGN PATENT DOCUMENTS

| | | |
|---|---|---|
| EP | 2293531 A1 | 3/2011 |
| EP | 2469443 A1 | 6/2012 |
| KR | 1020110050281 | 5/2011 |
| RU | 73 982 U1 | 6/2008 |
| WO | 2006010977 A1 | 2/2006 |

OTHER PUBLICATIONS

Hans Gellerson et al., "Supporting device discovery and spontaneous interaction with spatial references"; May 31, 2009, pp. 255-264; Personal and Ubiquitous Computing; Spring Verlac, Go; Engineering Information, Inc., NY, USA.
Michimune Koho et al., "Searching Common Experience: A Social Communication Tool Based on Mobile Ad-hoc Networking"; Sep. 19, 2005; pp. 15-22; MOBILECHI 05: Proceedings of the 71th International Conference on Human Computer Interaction with Mobile Devices and Services, Salzburg Austria, New York, USA.
European Search Report dated Sep. 19, 2014, issued in counterpart International Patent Application No. 13181550.8.
Communication dated May 12, 2016 issued by Russian Intellectual Property Office in counterpart Russian Application No. 2015110252/08(016141).
Communication dated Sep. 26, 2016, issued by the State Intellectual Property Office of the People's Republic of China in counterpart Chinese Patent Application No. 201380044505.1.

* cited by examiner

CONTROL METHOD AND CONTROL APPARATUS FOR APPARATUS INCLUDING SHORT RANGE WIRELESS COMMUNICATION MODULE

CROSS-REFERENCE TO RELATED PATENT APPLICATION

This application claims the benefit of Korean Patent Application No. 10-2012-0093248, filed on Aug. 24, 2012, in the Korean Intellectual Property Office, the disclosure of which is incorporated herein in its entirety by reference.

BACKGROUND

1. Field

Methods and apparatuses consistent with exemplary embodiments relate to a control method and control apparatus for an apparatus including a short range wireless communication module, and more particularly, to a display apparatus or a mobile terminal using short range wireless communication between the display apparatus and the mobile terminal, which include a plurality of short range communication modules, and a control method for the display apparatus or the mobile terminal.

2. Description of the Related Art

Recently, short range wireless communication modules are included in many mobile terminals. The short range wireless communication modules generally are non-contact type short range wireless communication modules that transmit data between terminals at a close distance within 10 cm.

Also, various display apparatuses from monitors to tabletop devices or wall displays are used. Technologies, such as touch screens, infrared ray (IR) sensors, and cameras, are applied to such display apparatuses to realize interactive displays.

However, it is difficult for general display apparatuses to display data via interaction with small apparatuses such as mobile terminals, and control each device.

SUMMARY

One or more exemplary embodiments provide a control method and control apparatus capable of determining a relative location of a mobile terminal with respect to a display apparatus by using short range wireless communication.

One or more exemplary embodiments also provide a control method and control apparatus capable of displaying data or a user interface on a display apparatus according to a relative location of a mobile terminal with respect to the display apparatus.

One or more exemplary embodiments also provide a control method and control apparatus capable of sharing data between a mobile terminal and a display apparatus or between mobile terminals.

One or more exemplary embodiments also provide a control method and control apparatus for displaying a user interface on a display apparatus and controlling a mobile terminal through the displayed user interface.

According to an aspect of the present invention, there is provided a method of controlling a display apparatus including a plurality of short range wireless communication modules, the method including: performing short range wireless communication with a mobile terminal through a short range wireless communication module included in the display apparatus; identifying the short range wireless communication module performing the short range wireless communication with the mobile terminal from among the plurality of short range wireless communication modules; determining a relative location of the mobile terminal with respect to the display apparatus according to the result of identifying; and determining a location on a screen of the display apparatus to display data according to the relative location and displaying the data on the screen of the display apparatus according to the determined location.

The relative location may be a location where the mobile terminal is placed on the screen of the display apparatus.

The relative location may be a location where the mobile terminal is placed within a predetermined range of a front portion of the display apparatus.

The method may further include receiving data to be displayed on the display apparatus from the mobile terminal.

The method may further include receiving information about the mobile terminal via the short range wireless communication, wherein the displaying of the data on the screen of the display apparatus may include displaying the data on the screen of the display apparatus while further considering the information about the mobile terminal.

The data may include a graphic user interface (GUI) object of the mobile terminal, and the displaying of the data on the screen of the display apparatus may include displaying a GUI including the GUI object according to the relative location of the mobile terminal with respect to the display apparatus.

The displaying of the data on the screen of the display apparatus may include gradually expanding a region where the GUI is displayed from the relative location of the mobile terminal with respect to the display apparatus.

The method may further include transmitting a control command input through the GUI displayed on the display apparatus to the mobile terminal through the short range wireless communication.

The performing of the short range wireless communication with the mobile terminal may include transmitting network information for connecting the mobile terminal and the display apparatus via a communication method other than the short range wireless communication to the mobile terminal, and the method may further include connecting to the mobile terminal via the other communication method by using the network information.

The connecting to the mobile terminal via the other communication method may include connecting to the mobile terminal through an access point included in the display apparatus.

The connecting to the mobile terminal via the other communication method may include: receiving a communication connection request according to the transmitted network information from the mobile terminal; and connecting to the mobile terminal by using a wireless fidelity (Wi-Fi) direct communication method according to the received communication connection request.

The method may further include: receiving information about a list of data stored in the mobile terminal from the mobile terminal; and displaying the received information about the list on the screen of the display apparatus according to the determined relative location.

The method may further include: receiving data through the other communication method from the mobile terminal; and storing the received data.

The method may further include transmitting the data stored in the display apparatus to the mobile terminal via the other communication method.

The method may further include: transmitting information about requesting to transmit the data stored in the mobile terminal to another mobile terminal connected to the display apparatus, to the mobile terminal; receiving information about a transmission state of the data from the mobile terminal; and displaying the received information about the transmission state on the screen of the display apparatus.

The method may further include receiving information about an application installed in the mobile terminal from the mobile terminal, wherein the displaying of the data may include: displaying an execution screen of the application installed in the mobile terminal on the screen of the display apparatus; and displaying a menu about the application of which the execution screen is displayed on the screen, on the screen of the display apparatus.

The method may further include: displaying data on the screen of the display apparatus; comparing the relative location of the mobile terminal with respect to the display apparatus and a region where the data is displayed on the screen of the display apparatus; and transmitting the data to the mobile terminal, when the relative location of the mobile terminal is included in the region where the data is displayed based on the result of comparing.

The determining of the relative location may include: receiving information about geomagnetism detected by a geomagnetic sensor included in the mobile terminal from the mobile terminal; comparing the received information about geomagnetism and information about geomagnetism detected by a geomagnetic sensor included in the display apparatus; and determining the relative location by detecting a relative angle of the mobile terminal with respect to a predetermined reference line of the display apparatus, based on the result of comparing.

According to another aspect of the present invention, there is provided a method of controlling a mobile terminal comprising a short range wireless communication module, the method including: performing short range wireless communication with a display apparatus through the short range wireless communication module included in the mobile terminal; receiving network information from the display apparatus via the short range wireless communication; connecting to the display apparatus by using a method other than the short range wireless communication based on the received network information; and transmitting data to be displayed on the display apparatus based on the connection.

The connecting to the display apparatus may include connecting to the display apparatus by connecting to an access point included in the display apparatus.

The connecting to the display apparatus may include connecting to the display apparatus by using a wireless fidelity (Wi-Fi) direct communication method by using the network information.

The data to be displayed may include information about a list of data stored in the mobile terminal.

The method may further include: receiving information about requesting to transmit data included in the list of data stored in the mobile terminal to another mobile terminal, and information for linking communication with the other mobile terminal, from the display apparatus; linking communication with the other mobile terminal based on the information for linking communication with the other mobile terminal; transmitting the data to the other mobile terminal; and transmitting information about a transmission state of the data to the display apparatus.

The data to be displayed may include information about a graphic user interface (GUI) object of the mobile terminal.

The method may further include: receiving a control command from the display apparatus; performing the received control command; and returning the result of performing the control command to the display apparatus.

The method may further include determining data to be transmitted to the display apparatus according to a state of the mobile terminal.

The method may further include: receiving identification information of the short range wireless communication module included in the display apparatus via the short range wireless communication from the display apparatus; and upon receiving the identification information, transmitting information about geomagnetism detected by a geomagnetic sensor included in the mobile terminal to the display apparatus.

According to another aspect of the present invention, there is provided a display apparatus capable of communication, the display apparatus including: a plurality of short range wireless communication modules capable of short range wireless communication with a mobile terminal; an identification unit for identifying a short range wireless communication module performing short range wireless communication with the mobile terminal from among the plurality of short range wireless communication modules; a location determination unit for determining a relative location of the mobile terminal with respect to the display apparatus according to the result of identifying by the identification unit; and a screen output unit for determining a location to display data to be displayed on the screen of the display apparatus according to the relative location determined by the location determination unit, and displaying the data on the screen of the display apparatus according to the determined location.

The relative location may be a location where the mobile terminal is placed on the screen of the display apparatus.

The relative location may be a location where the mobile terminal is placed within a predetermined range of a front portion of the display apparatus.

The display apparatus may further include a data transceiver for receiving the data to be displayed from the mobile terminal.

The data transceiver may receive information about the mobile terminal via the short range wireless communication, and the screen output unit may display the data on the screen of the display apparatus while further considering the information about the mobile terminal.

The data may include a graphic user interface (GUI) object of the mobile terminal, the display apparatus may further include a GUI generation unit for generating a GUI comprising the GUI object, and the screen output unit may display the generated GUI comprising the GUI object according to the relative location of the mobile terminal with respect to the display apparatus.

The screen output unit may gradually expand a region where the GUI is displayed from the relative location of the mobile terminal with respect to the display apparatus.

The data transceiver may transmit a control command input through the GUI displayed on the display apparatus to the mobile terminal through the short range wireless communication.

The display apparatus may further include a network connection unit for transmitting network information for connecting the mobile terminal and the display apparatus to the mobile terminal through the short range wireless communication module by using a communication method other than the short range wireless communication, and connecting to the mobile terminal by using the other communication method using the network information.

The network connection unit may connect to the mobile terminal through an access point included in the display apparatus.

The network connection unit may connect to the mobile terminal by using a wireless fidelity (Wi-Fi) direct communication method.

The display apparatus may further include: a data transceiver for receiving data from the mobile terminal; and a data storage unit for storing the received data.

The display apparatus may further include: a data storage unit for storing data; and a data transceiver for transmitting the data stored in the data storage unit to the mobile terminal by using a communication method connected through the network connection unit.

The display apparatus may further include a data transceiver for receiving information about a list of data stored in the mobile terminal from the mobile terminal, wherein the screen output unit may display the received list on the screen of the display apparatus according to the relative location.

The display apparatus may further include a data transceiver for transmitting information about requesting to transmit data stored in the mobile terminal to another mobile terminal connected to the display apparatus, and receiving information about a transmission state of the data from the mobile terminal, wherein the screen output unit may display the information about the transmission state on the screen of the display apparatus.

The display apparatus may further include a data transceiver for receiving information about an application installed in the mobile terminal from the mobile terminal, wherein the screen output unit may display an execution screen of the application installed in the mobile terminal and a menu about the application of which the execution screen is displayed on the screen, according to the relative location of the mobile terminal.

The screen output unit may display data on the screen of the display apparatus, the location determination unit may compare the relative location of the mobile terminal and a region where the data is displayed on the screen of the display apparatus, and the display apparatus may further include a data transceiver for transmitting the data to the mobile terminal when the relative location of the mobile terminal is included in the region where the data is displayed based on the result of comparing by the location determination unit.

At least one of the short range wireless communication modules may receive information about geomagnetism detected by a geomagnetic sensor included in the mobile terminal from the mobile terminal, and the location determination unit may determine the relative location while further considering the result of comparing the received information about geomagnetism and information about geomagnetism detected by a geomagnetic sensor included in the display apparatus.

The plurality of short range wireless communication modules may be arranged in a lattice shape on a rear portion of the screen of the display apparatus.

According to another aspect of the present invention, there is provided a mobile terminal comprising a short range wireless communication module, the mobile terminal including: a short range wireless communication unit for receiving network information from a display apparatus through the short range wireless communication module included in the mobile terminal; a network connection unit for connecting to the display apparatus by using a communication method other than short range wireless communication based on the received network information; and a data transceiver for transmitting data to be displayed on the display apparatus based on the connection.

The network connection unit may connect to the display apparatus by connecting to an access point included in the display apparatus.

The network connection unit may connect to the display apparatus via a wireless fidelity (Wi-Fi) direct communication method by using the network information.

The data to be displayed may include information about a list of data stored in the mobile terminal.

The data to be displayed may include information about a graphic user interface (GUI) object of the mobile terminal.

The data transceiver may receive a control command from the display apparatus, and the mobile terminal may further include a control unit for controlling the mobile terminal according to the received control command and returning the result of performing the control command to the display apparatus.

The data transceiver may determine data to be transmitted to the display apparatus according to a state of the mobile terminal.

The mobile terminal may further include a geomagnetic sensor for generating information about geomagnetism via detection, wherein the short range wireless communication unit may transmit the information about the geomagnetism to the display apparatus through the short range wireless communication.

BRIEF DESCRIPTION OF THE DRAWINGS

The above and other aspects will become more apparent by describing in detail exemplary embodiments with reference to the attached drawings in which.

DETAILED DESCRIPTION

Figure 1:
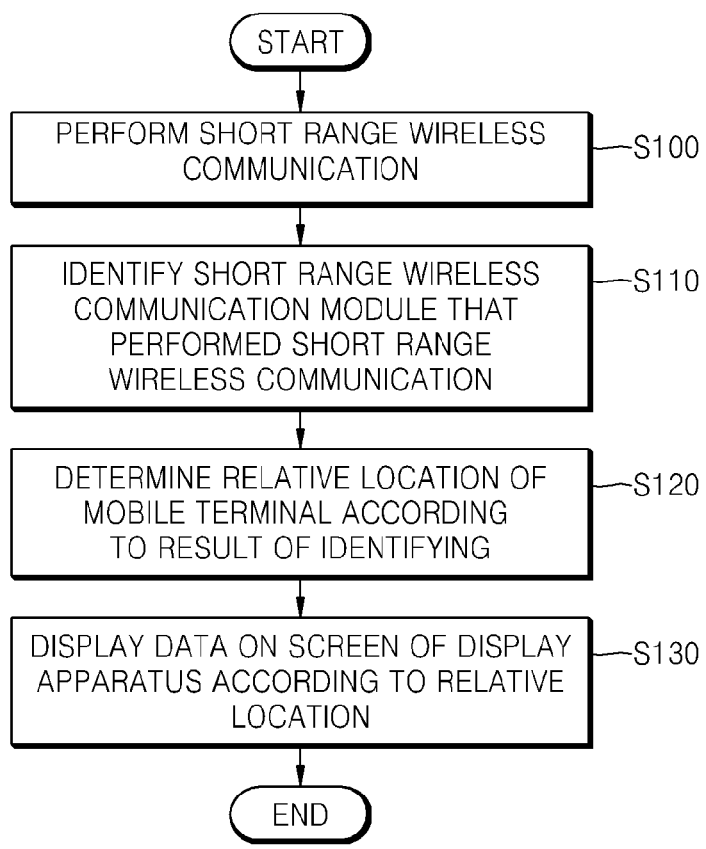
FIG. 1 is a flowchart illustrating a process of displaying data on a screen of a display apparatus according to a relative location of a mobile terminal with respect to the display apparatus, by the display apparatus, according to an exemplary embodiment.

Hereinafter, exemplary embodiments will be described more fully with reference to the accompanying drawings. The inventive concept may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In drawings, elements irrelevant to description are not shown for clear description, and like elements denote like reference numerals throughout the specification.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

FIG. 1 is a flowchart illustrating a process of displaying data on a screen of a display apparatus according to a relative location of a mobile terminal with respect to the display apparatus, by a display apparatus, according to an exemplary embodiment.

The display apparatus 1100 performs short range wireless communication with the mobile terminal through a short range wireless communication module included in the display apparatus, in operation S100.

According to an exemplary embodiment, the display apparatus may receive information about the mobile terminal through the short range wireless communication. Here, the display apparatus may include profile information about the mobile terminal, such as a type of the mobile terminal, a size of the mobile terminal, and a shape of the mobile terminal.

According to another exemplary embodiment the display apparatus may receive information about geomagnetism detected by a geomagnetic sensor included in the mobile terminal from the mobile terminal through short range wireless communication. The information about the geomagnetism may be used to determine a direction where the mobile terminal is placed.

In the present specification, the direction of the mobile terminal is determined by using the geomagnetic sensor, but the geomagnetic sensor may be replaced by another sensor, such as a tilt sensor, to determine the direction of the mobile terminal.

Then, the display apparatus may identify the short range wireless communication module that performed the short range wireless communication with the mobile terminal, from among a plurality of short range wireless communication modules, in operation S110.

According to an embodiment, an identification may be set for each of the short range wireless communication modules. For example, identification values N1, N2, N3, and N4 may be respectively set for four short range wireless communication modules included in the display apparatus. Here, when an event of performing short range wireless communication with the mobile terminal is generated in the short range wireless communication module having the identification value of N2, the display apparatus may obtain the identification value of N2. The display apparatus may identify the short range wireless communication module that performed the short range wireless communication with the mobile terminal according to the obtained identification value.

Then, in operation S120, the display apparatus may determine a relative location of the mobile terminal with respect to the display apparatus, according to the result of identifying in operation S110.

According to an embodiment, a table for matching a coordinate value indicating a location of the mobile terminal on the screen of the display apparatus to the identification value of the short range wireless communication module may be stored in the display apparatus. For example, coordinate values (x1, y1), (x1, y2), (x2, y1), and (x2, y2) may be matched respectively to the identification values N1 through N4. When the display apparatus obtains the identification value N2 in operation S110, the display apparatus may determine that the mobile terminal is located at a location corresponding to the coordinate value (x1, y2) on the screen of the display apparatus.

Figure 13:
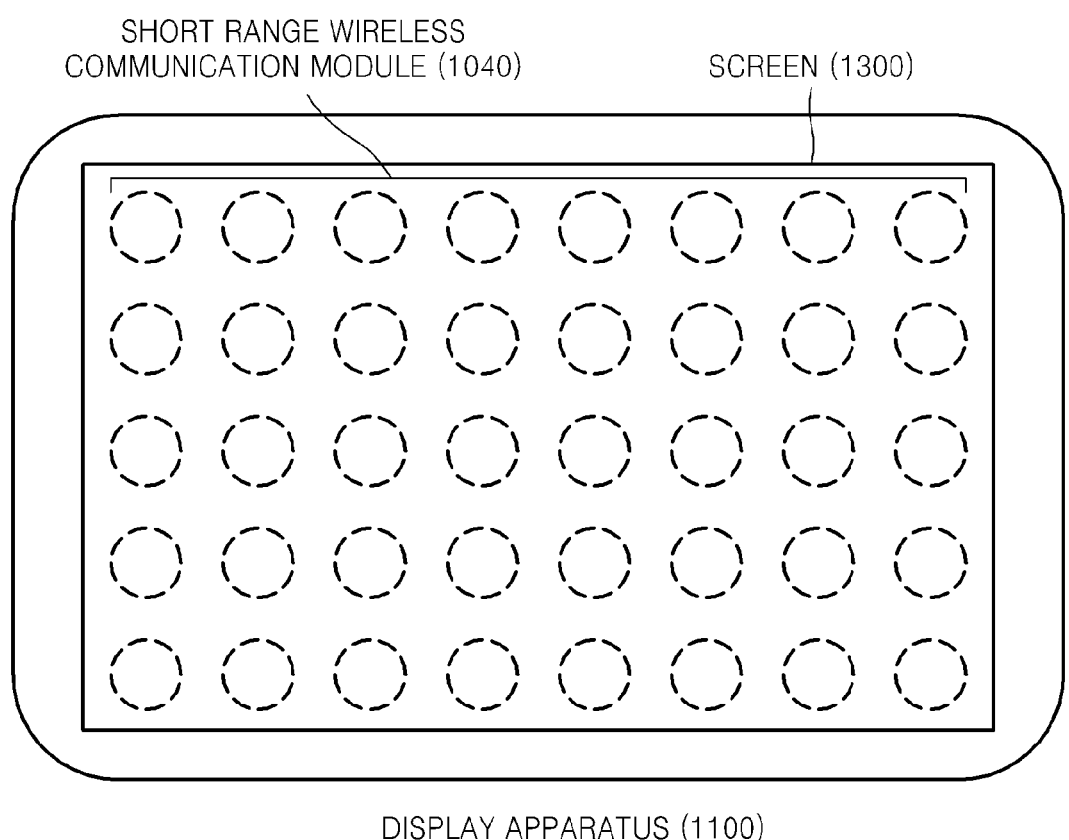
FIG. 13 is a diagram briefly illustrating a structure of a display apparatus and a short range wireless communication mobile, according to an exemplary embodiment.

Also, according to an exemplary embodiment, the relative location may denote the location of the mobile terminal on the screen of the display apparatus. For example, when short range wireless communication modules 1040 are arranged in a lattice shape on a rear portion of a screen 1300 of a display apparatus 1100 as shown in FIG. 13, the mobile terminal 1110 may be placed on the screen of the display apparatus 1100 so that the short range wireless communication module 1040 performs the short range wireless communication with the mobile terminal. Accordingly, the display apparatus may identify the short range wireless communication module that performed the short range wireless communication with the mobile terminal to determine the location of the mobile terminal on the screen of the display apparatus.

Figure 18:
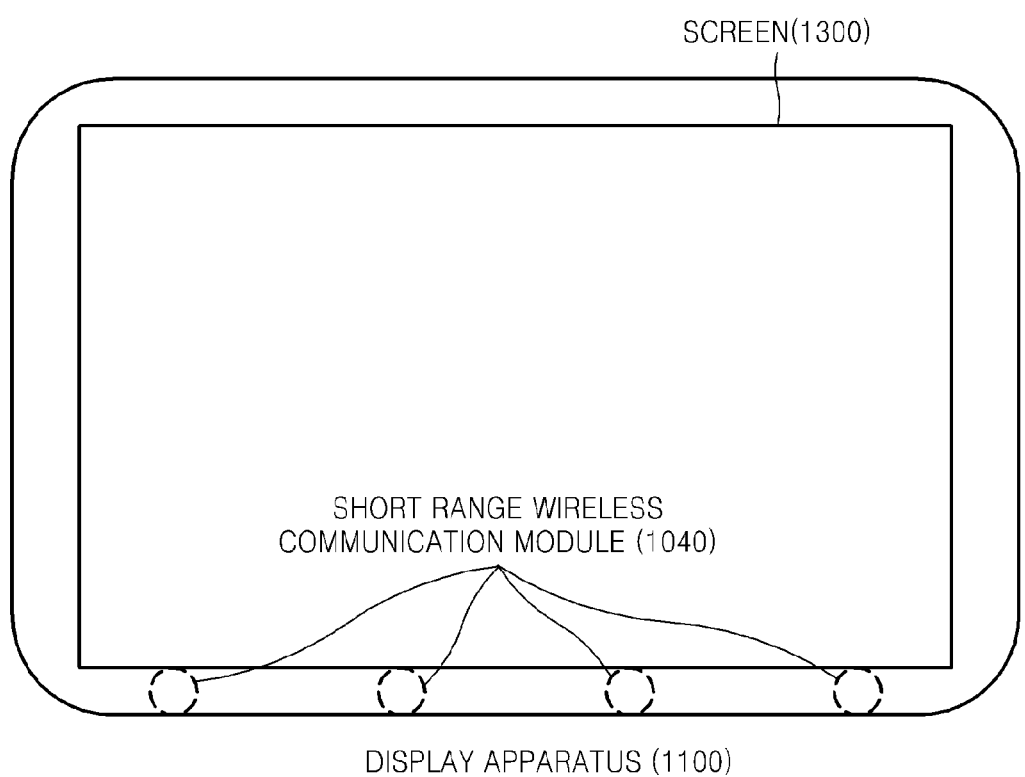
FIG. 18 is a diagram of a structure of a display apparatus and a short range wireless communication module, according to another exemplary embodiment.

Alternatively, according to another exemplary embodiment, the relative location may denote the location of the mobile terminal within a predetermined range of a front portion of the display apparatus. For example, as shown in FIG. 18, when the short range wireless communication modules 1040 are disposed on a front portion of the display apparatus 1100, the mobile terminal may be placed within a predetermined range of the front portion of the display apparatus 1100 so that the short range wireless communication module 1040 performs short range wireless communication with the mobile terminal. Accordingly, the display apparatus may identify the short range wireless communication module that performed the short range wireless communication with the mobile terminal to determine the location of the mobile terminal on the screen of the display apparatus.

Alternatively, according to another exemplary embodiment, the display apparatus may compare information about geomagnetism that is detected by a geomagnetic sensor included in the mobile terminal and received from the mobile terminal, and information about geomagnetism detected by a geomagnetic sensor included in the display apparatus. The display apparatus may determine the direction of the mobile terminal placed on the screen of the display apparatus according to the result of comparing.

FIGS. 13 and 18 are only exemplary embodiments, and the inventive concept is not limited to structures shown in FIGS. 13 and 18.

Then, in operation S130, the display apparatus may display data according to the relative location of the mobile terminal determined in operation S120.

Here, the data may be data transmitted from the mobile terminal or data stored in a data storage unit of the display apparatus. In addition, the data may include information to be displayed on the display apparatus or the mobile terminal. For example, a photograph, a moving image, a document, or a web page may be included in the data to be displayed on the display apparatus.

According to an embodiment, the display apparatus may receive data through the short range wireless communication from the mobile terminal. For example, uniform resource locator (URL) information may be received through the short range wireless communication from the mobile terminal, and a web page may be displayed by using the received URL information.

According to another embodiment, the display apparatus may connect to the mobile terminal by using a wireless communication method other than the short range wireless communication. Then, the display apparatus may receive data from the mobile terminal by using the other wireless communication method. For example, a sub-system identification (SSID) and a password for an access point connected to the display apparatus may be transmitted to the mobile terminal via the short range wireless communication, and the mobile terminal may connect to the access point. The display apparatus may connect to the mobile terminal through the access point. Here, the access point may be included in the display apparatus.

According to an exemplary embodiment, the display apparatus may display the data while further considering information about the mobile terminal in operation S130. For example, the data may be displayed at a location on the screen away from the relative location by a predetermined distance while further considering a size of the mobile terminal.

According to another exemplary embodiment, the display apparatus may display data on the screen according to the direction of the mobile terminal determined in operation S130. For example, when the geomagnetism detected by the mobile terminal and the display apparatus is tilted by 30°, the data may be displayed in a tilted state by 30° to the right on the screen.

Figure 2:
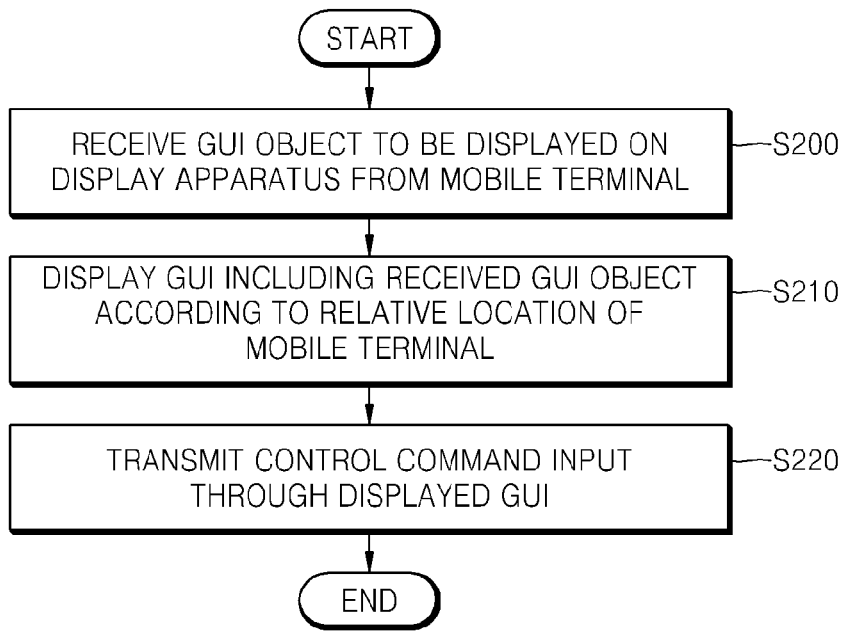
FIG. 2 is a flowchart illustrating a process of displaying a graphic user interface (GUI) on a screen of a display apparatus by receiving a GUI object from a mobile terminal, by the display apparatus, according to an exemplary embodiment.

FIG. 2 is a flowchart illustrating a process of displaying a graphic user interface (GUI) on a screen of a display apparatus by receiving a GUI object from a mobile terminal, by the display apparatus, according to an exemplary embodiment.

The display apparatus may receive data to be displayed on the display apparatus from the mobile terminal in operation S200. Here, the received data may include the GUI object.

According to an exemplary embodiment, the GUI object may denote an object used to display a GUI. For example, a button, an image, or an icon included in the GUI may be included in the GUI object.

Then, the display apparatus may display the GUI including the received GUI object according to the relative location of the mobile terminal based on the received GUI object, in operation S210.

Figure 14:
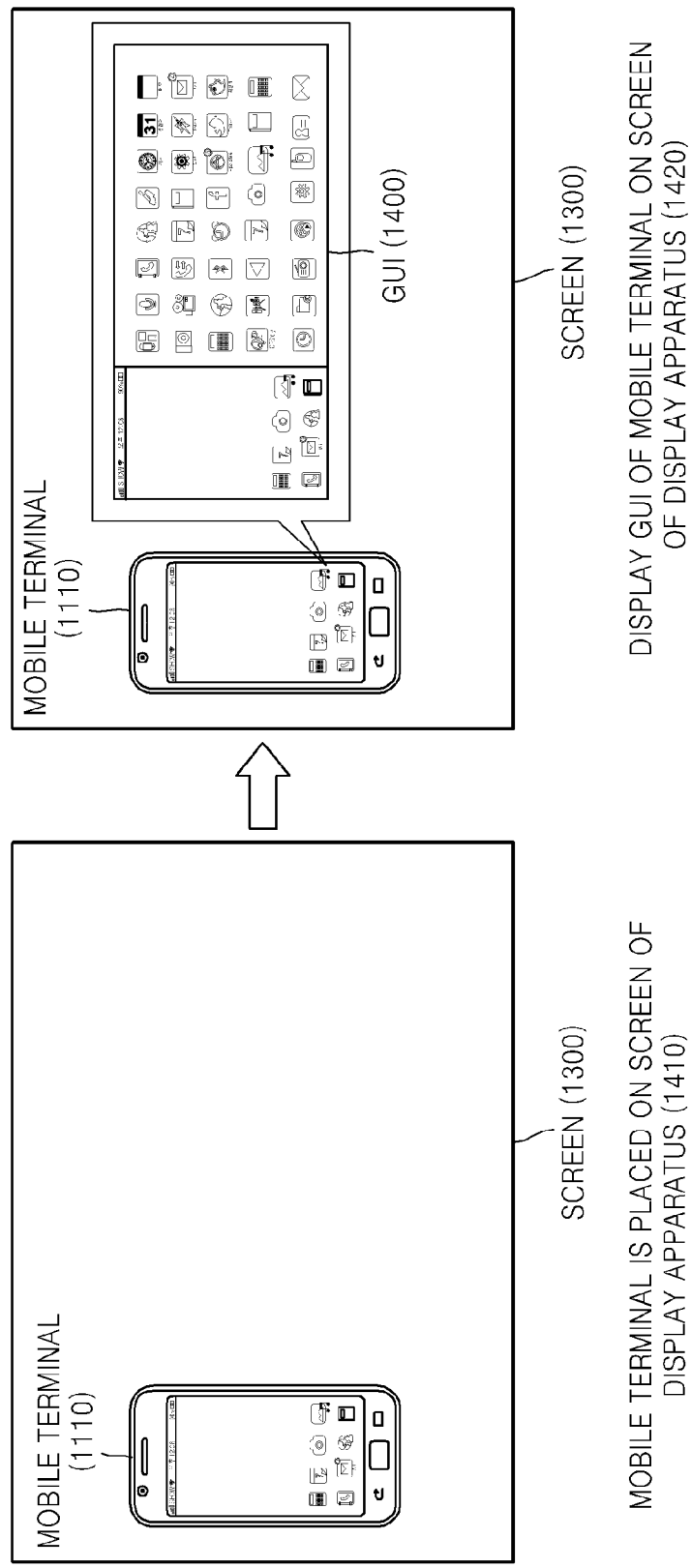
FIG. 14 is a diagram of a screen of a display apparatus displaying a GUI according to a location of a mobile terminal, according to an exemplary embodiment.

According to an exemplary embodiment, as shown in screen displaying GUI of mobile terminal 1420 of FIG. 14, a GUI 1400 may be displayed on the right a mobile terminal 1110 according to the location of the mobile terminal 1110 on the screen 1300 of the display apparatus 1100.

According to another exemplary embodiment, as will be described with reference to FIGS. 7 and 8, the mobile terminal may be disposed within a predetermined range of the front portion of the display apparatus. A region of the GUI displayed on the screen of the display apparatus may gradually expand from the location on the screen corresponding to the location of the mobile terminal.

Then, the display apparatus may transmit a control command input through the displayed GUI to the mobile terminal, in operation S220. For example, an icon for executing an application installed in the mobile terminal may be displayed on the display apparatus. When a user selects the icon displayed on the display apparatus, the display apparatus may transmit an application execution command to the mobile terminal.

Figure 3:
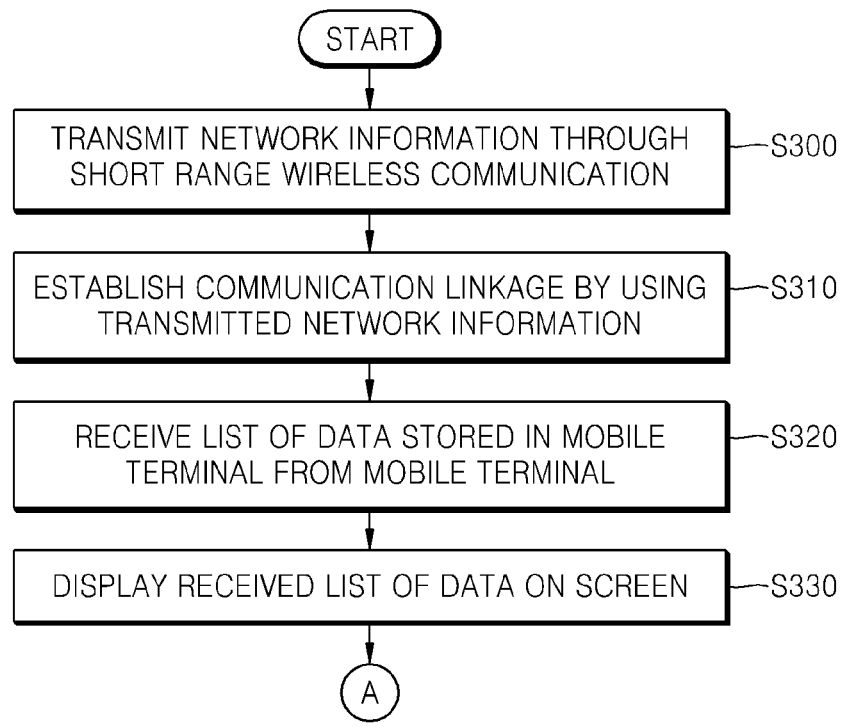
FIG. 3 is a flowchart illustrating a process of connecting to a mobile terminal in a communication method other than short range wireless communication and displaying a list about data stored in the mobile terminal, by a display apparatus, according to an exemplary embodiment.

FIG. 3 is a flowchart illustrating a process of connecting to a mobile terminal in a communication method other than short range wireless communication and displaying a list about data stored in the mobile terminal, by a display apparatus, according to an exemplary embodiment.

The display apparatus may transmit network information for connecting the mobile terminal and the display apparatus to the mobile terminal by using the other communication method instead of the short range wireless communication, in operation S300.

According to an exemplary embodiment, the network information may be information for the mobile terminal to connect to the display apparatus. For example, the network information may include information for pairing the mobile terminal and the display apparatus through the Bluetooth standard. Alternatively, the network information may include information for the mobile terminal to connect to the display apparatus through a wireless fidelity (Wi-Fi) direct. Alternatively, the network information may include an SSID of an access point for the mobile terminal to connect to the access point connected to the display apparatus.

According to an exemplary embodiment, the network information may include information about a list of communication methods performable by the display apparatus.

Then, the display apparatus may establish a communication linkage with the mobile terminal based on the transmitted network information, in operation S310. For example, the display apparatus and the mobile terminal may be paired through the Bluetooth standard or connected via Wi-Fi communication.

Then, in operation S320, the display apparatus may receive the information about the list of data stored in the mobile terminal from the mobile terminal through the communication linkage established in operation S310.

According to an exemplary embodiment, for example, the information about the list of data stored in the mobile terminal may include a list of contents, such as photographs and moving images, stored in the mobile terminal. Also, the information about the list of data stored in the mobile terminal may include a list of applications installed in the mobile terminal. The information about the list of data stored in the mobile terminal may include a list of other data stored in the mobile terminal, aside from above examples.

Also, according to an exemplary embodiment, the information about the list of data stored in the mobile terminal may include additional information about data included in the list. For example, the information about the list of data stored in the mobile terminal may include meta data including a thumbnail image of the data included in the list. Alternatively, the information about the list of data stored in the mobile terminal may include a stop image obtained from a frame buffer of the mobile terminal, if the data is a moving image. Alternatively, the information about the list of data stored in the mobile terminal may include an execution icon about an application included in the list.

Then, the display apparatus may display the received information about the list of data on the screen according to the location of the mobile terminal determined according to the process of FIG. 1, in operation S330.

According to an exemplary embodiment, the display apparatus may display the received information about the list of data according to the location of the mobile terminal determined in operation S120 of FIG. 1. For example, when the location of the mobile terminal is determined to be the coordinate value (x1, y1), the display apparatus may display the data based on an coordinate value (x1+a, y1) corresponding to the location that is moved by a predetermined pixel value from the coordinate value (x1, y1).

Figure 4:
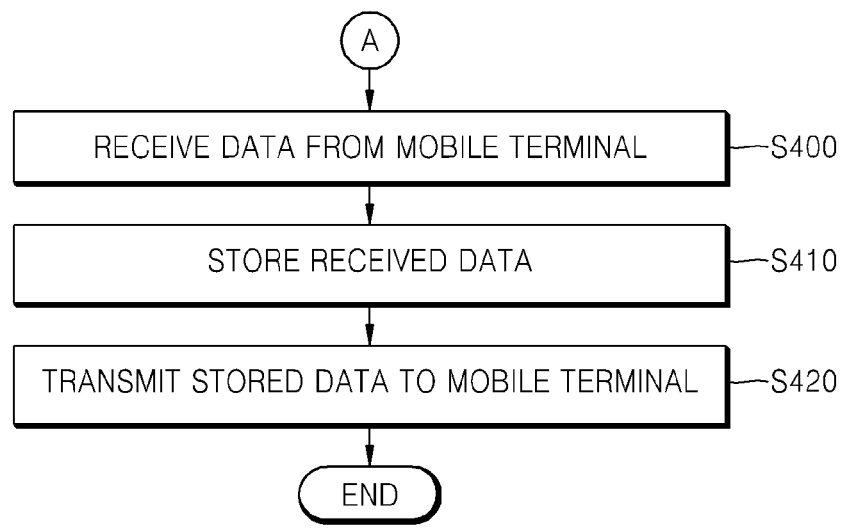
FIG. 4 is a flowchart illustrating a process of receiving and storing data from a mobile terminal, and transmitting the stored data to the mobile terminal, by a display apparatus, according to an exemplary embodiment.

FIG. 4 is a flowchart illustrating a process of receiving and storing data from a mobile terminal, and transmitting the stored data to the mobile terminal, by a display apparatus, according to an exemplary embodiment.

The display apparatus may receive data from the mobile terminal in operation S400. Here, according to an exemplary embodiment, the display apparatus may receive the data through the communication linkage established in operation S310 of FIG. 3.

According to an exemplary embodiment, the display apparatus may select data according to an input of a user from among the list of data displayed in operation S330 of FIG. 3. The display apparatus may receive the selected data from the mobile terminal.

Then, the display apparatus may store the data received from the mobile terminal in a data storage unit included in the display apparatus, in operation S410. The display apparatus may transmit the stored data to the mobile terminal connected to the display apparatus according to an input of the user in operation S420. Here, the mobile terminal connected to the display apparatus and to which the data is transmitted may be a mobile terminal other than the mobile terminal that received the data in operation S400.

Figure 16:
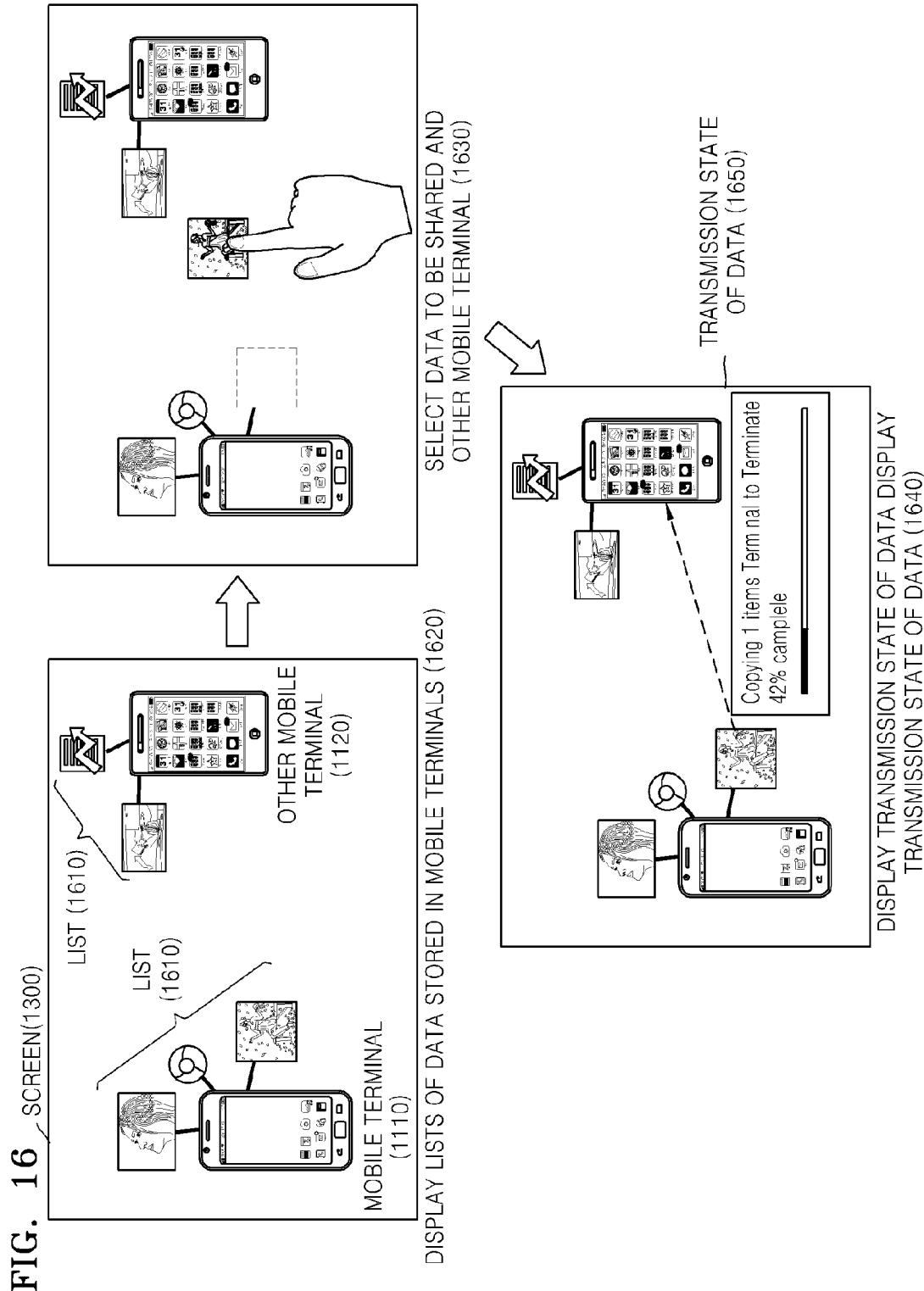
FIG. 16 is a diagram of a screen of a display apparatus displayed during a process of displaying a list of data stored in a mobile terminal on the screen of the display apparatus and controlling the mobile terminal to share the list of data stored in the mobile terminal with another mobile terminal, by the display apparatus, according to an exemplary embodiment.

For example, as shown in FIG. 16, a mobile terminal 1120 other than the mobile terminal 1110 may be connected to the display apparatus 1100, and the list of data stored in the mobile terminal 1110 may be displayed on the screen 1300 of the display apparatus 1100. Here, as shown in selecting data to be shared and other mobile terminal 1630 of FIG. 16, as an event of dragging and dropping any data in the list of data stored in the mobile terminal 1110 is generated in the other mobile terminal 1120, the display apparatus 1100 may receive and store the selected data in a cache included in the display apparatus and transmit the data to the mobile terminal 1110.

In FIG. 16, an input of the user is received via a drag-and-drop method, but a method of receiving the input may vary.

Figure 5:
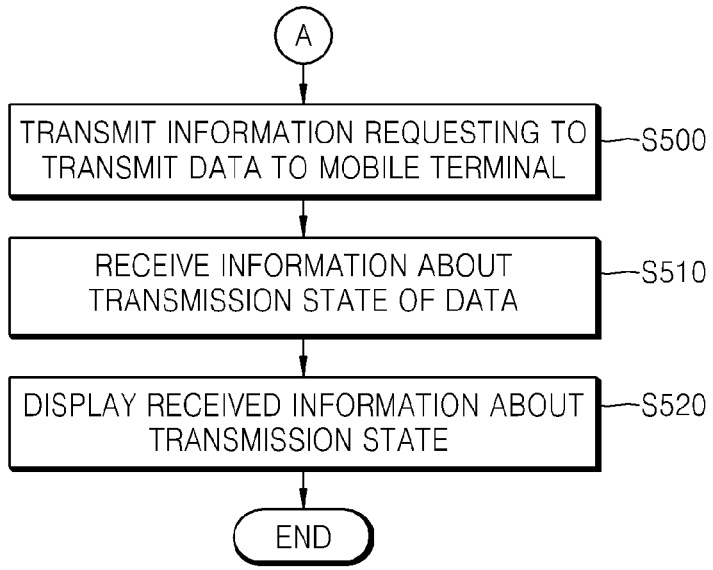
FIG. 5 is a flowchart illustrating a process of requesting a mobile terminal to share data with another mobile terminal and displaying information about a transmission state of data, by a display apparatus, according to an exemplary embodiment.

FIG. 5 is a flowchart illustrating a process of requesting a mobile terminal to share data with another mobile terminal and displaying information about a transmission state of data, by a display apparatus, according to an exemplary embodiment.

The display apparatus may transmit information requesting to transmit data to the other mobile terminal according to an input of the user to the mobile terminal in operation S500. Here, according to an exemplary embodiment, the information requesting to transmit data to the mother mobile terminal may include information for the mobile terminal to link communication with the other mobile terminal. The information for the mobile terminal to link communication with the other mobile terminal may include information about a communication method supportable by the other mobile terminal, internet protocol (IP) information for connecting to the other mobile terminal, information for connecting to the other mobile terminal via a Wi-Fi direct method, or information for performing pairing through a Bluetooth communication method.

Here, according to an exemplary embodiment, by transmitting the information requesting to transmit data to the other mobile terminal to the mobile terminal, information requesting to receive data may be transmitted to the other mobile terminal. For example, an identification value, such as a multiple analog components (MAC) address, for identifying the mobile terminal to transmit data, and network information about the mobile terminal may be transmitted to the other mobile terminal. Upon receiving request for communication linkage and data reception from the mobile terminal that matches with the received identification value and the network information, the other mobile terminal may perform communication linkage and data reception based on the request.

Then, the display apparatus may receive information about a transmission state of the data requested to be transmitted from the mobile terminal in operation S510, and the received information about the transmission state may be displayed on the screen of the display apparatus in operation S520. For example, as shown in status 1640 of FIG. 16, the transmission data of data may be displayed on the screen 1300.

In FIG. 16, an input of the user is received via a drag-and-drop method, but a method of receiving the input may vary.

Figure 6:
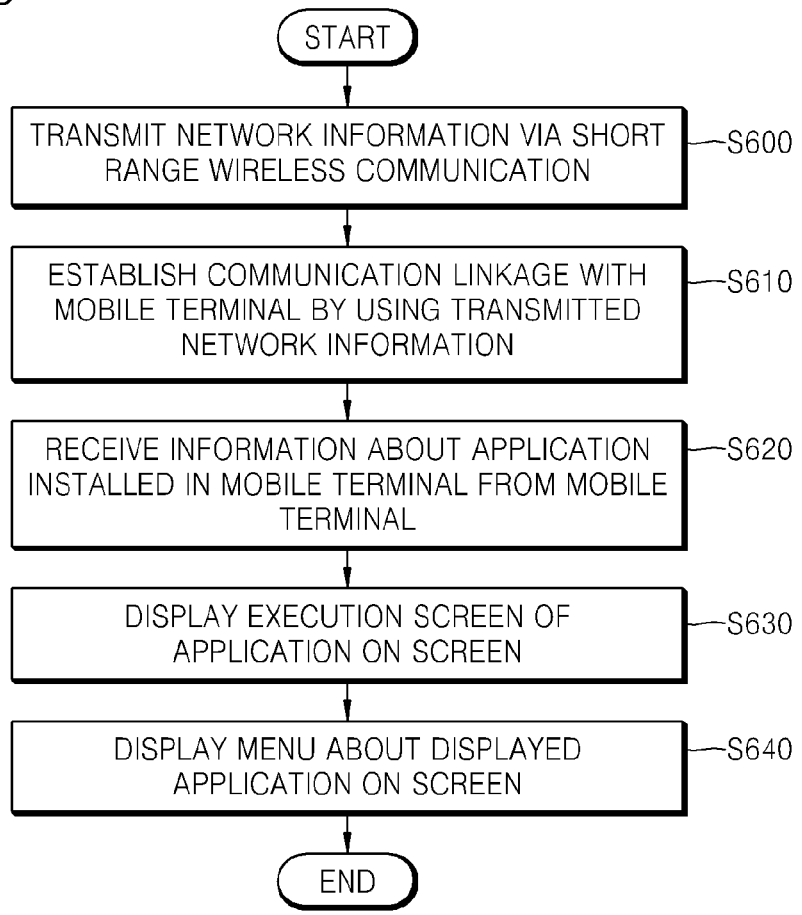
FIG. 6 is a flowchart illustrating a process of displaying an execution screen of an application installed in a mobile terminal and displaying a menu for controlling the application, by a display apparatus, according to an exemplary embodiment.

FIG. 6 is a flowchart illustrating a process of displaying an execution screen of an application installed in a mobile terminal and displaying a menu for controlling the application, by a display apparatus, according to an exemplary embodiment.

The display apparatus may transmit network information for connecting the mobile terminal and the display apparatus to the mobile terminal via a communication method other than short range wireless communication, in operation S600. Then, the display apparatus may establish a communication linkage with the mobile terminal based on the transmitted network information, in operation S610.

Then, in operation S620, the display apparatus may receive information about an application installed in the mobile terminal from the mobile terminal, based on the communication linkage established in operation S610. Here, according to an exemplary embodiment, the information about the application installed in the mobile terminal may include information about an application being executed in the mobile terminal.

Also, according to an exemplary embodiment, the information about the application installed in the mobile terminal 1110 may include an execution screen of the application.

Then, the display apparatus may display an execution screen of the application on the screen based on the information about the application installed in the mobile terminal, in operation S630.

Here, according to an exemplary embodiment, the display apparatus may display the execution screen of the application included in the information about the application installed in the mobile terminal, on the screen.

According to another exemplary embodiment, the display apparatus may receive the application from the mobile terminal and display the execution screen of the application on the screen by executing the received application.

Then, the display apparatus may display a menu about the displayed application on the screen in operation S640. For example, when an execution screen of an application for reproducing a moving image is displayed on the screen, a menu for controlling the moving image may be displayed on the screen.

Figure 7:
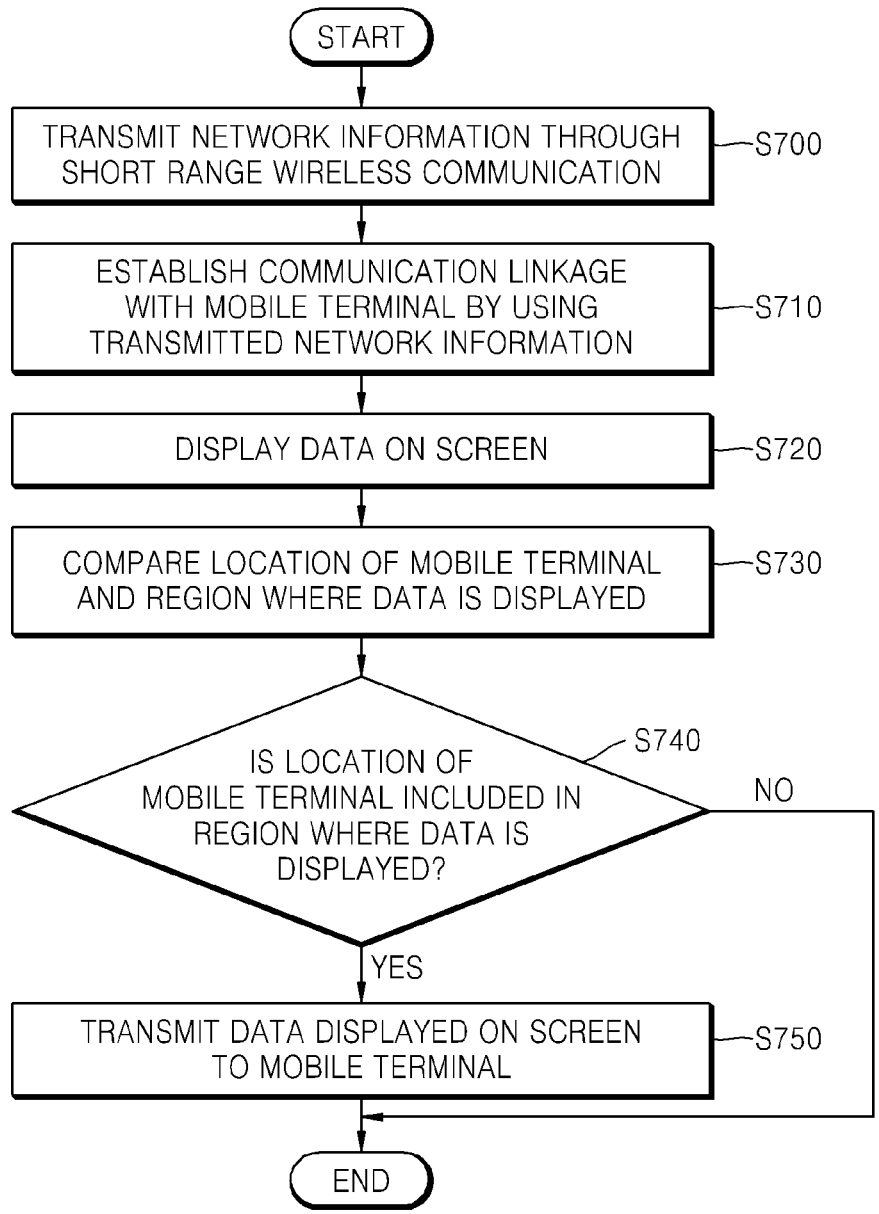
FIG. 7 is a flowchart illustrating a process of transmitting data displayed on a screen of a display apparatus to a mobile terminal, by the display apparatus, according to an exemplary embodiment.

FIG. 7 is a flowchart illustrating a process of transmitting data displayed on a screen of a display apparatus to a mobile terminal, by the display apparatus, according to an exemplary embodiment.

The display apparatus may transmit network information for connecting the mobile terminal and the display information to the mobile terminal by using a communication method other than short range wireless communication, in operation S700. Then, the display apparatus may establish a communication linkage with the mobile terminal based on the transmitted network information, in operation S710.

The display apparatus may display data on the screen in operation S720. Here, the data may be data stored in a data storage unit of the display apparatus.

Then, in operation S730, the display apparatus may determine a location of the mobile terminal based on the short range wireless communication performed in operation S700, and compare the location of the mobile terminal and a region where the data is displayed on the screen of the display apparatus. The display apparatus may determine whether the location of the mobile terminal is included in the region where the data is displayed in operation S740, based on the result of comparing.

Figure 17:
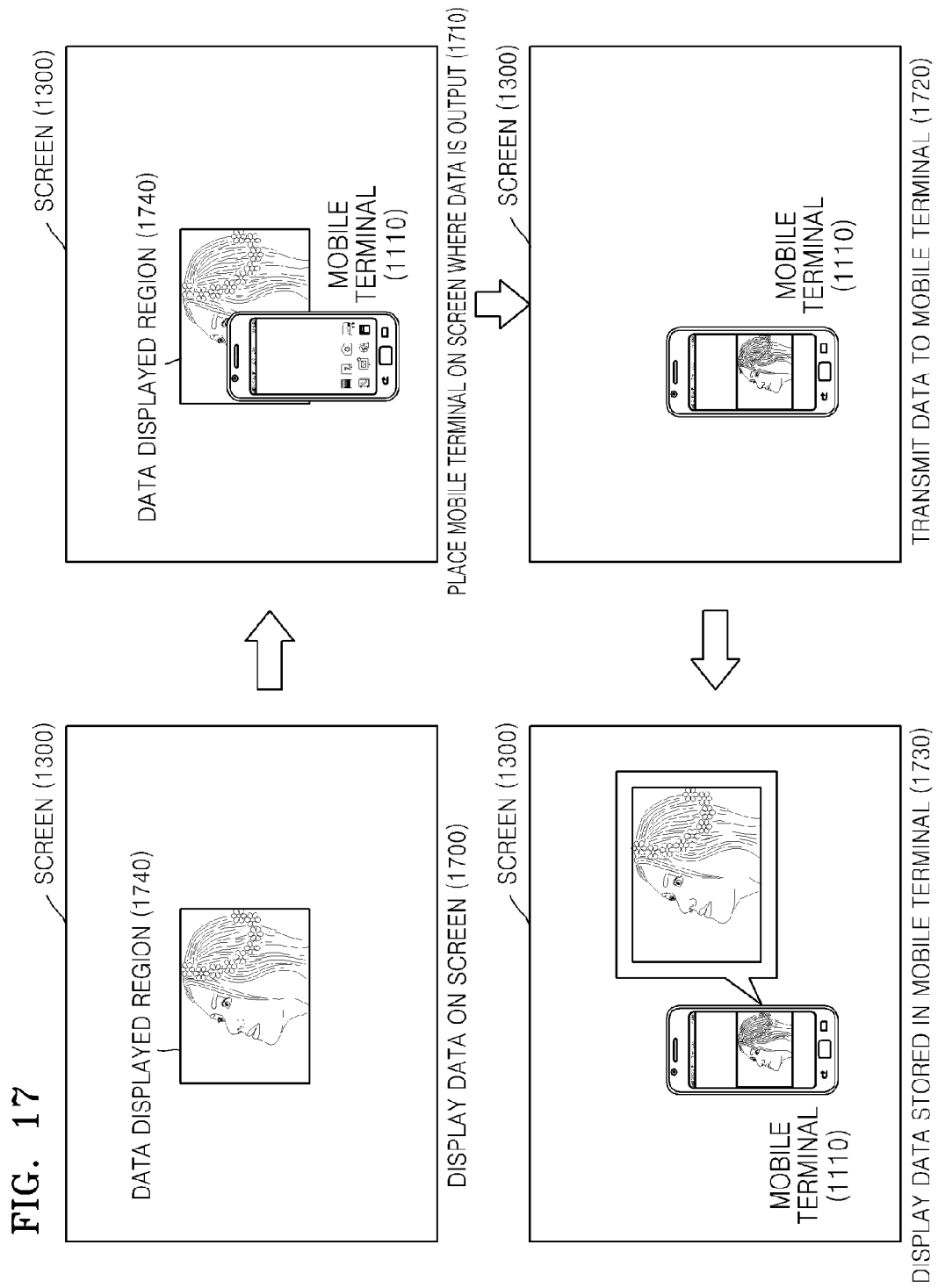
FIG. 17 is a diagram for describing a process of transmitting content displayed on a screen of a display apparatus to a mobile terminal, by the display apparatus, according to an exemplary embodiment.

For example, as shown in FIG. 17, the mobile terminal 1110 may be placed on a region of the screen 1300 where data is output. Here, the location where the mobile terminal is placed on the screen may be determined through the process of FIG. 1. The display apparatus may determine whether the location of the mobile terminal is included in the region where the data is displayed.

If it is determined that the location of the mobile terminal is included in the region where the data is displayed in operation S740, the display apparatus may transmit the data displayed on the screen to the mobile terminal in operation S750.

Figure 8:
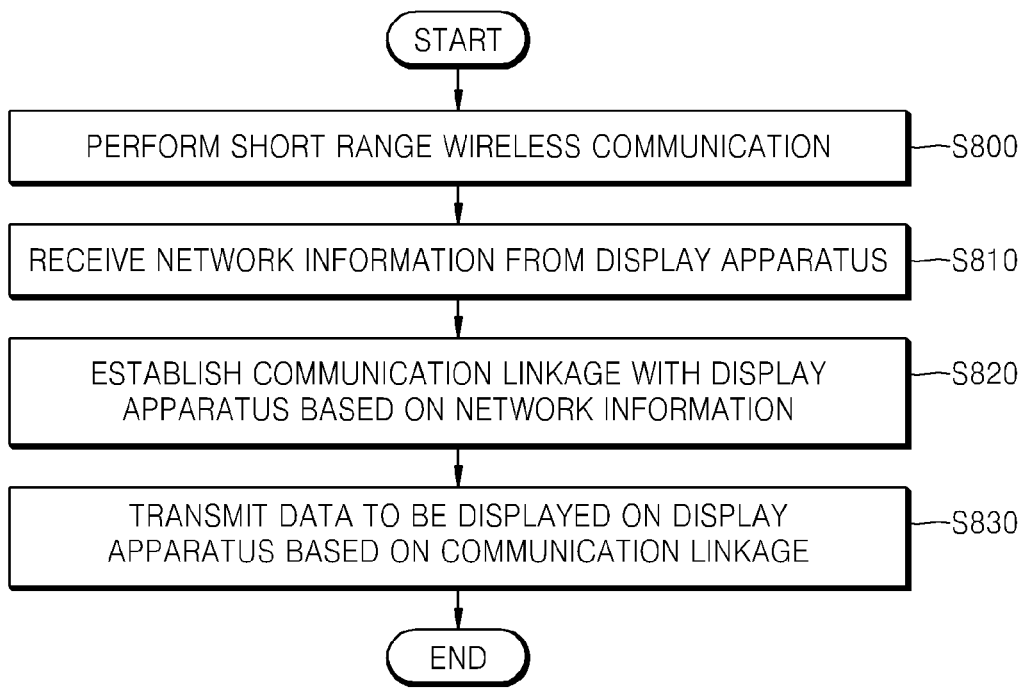
FIG. 8 is a flowchart illustrating a process of connecting to a display apparatus via a communication method other than short range wireless communication to transmit and receive data, by a mobile terminal, as the mobile terminal performs short range wireless communication with the display apparatus, according to an exemplary embodiment.

FIG. 8 is a flowchart illustrating a process of connecting to a display apparatus via a communication method other than short range wireless communication to transmit and receive data, by a mobile terminal, as the mobile terminal performs short range wireless communication with the display apparatus, according to an exemplary embodiment.

The mobile terminal may perform short range wireless communication with a short range wireless communication module included in the display apparatus, in operation S800. Then, the mobile terminal may receive network information for establishing connection with the display apparatus in a communication method other than the short range wireless communication, via the short range wireless communication, from the display apparatus, in operation S810.

According to an exemplary embodiment, the network information may be information for the mobile terminal to connect to the display apparatus. For example, the network information may include information for pairing the mobile terminal and the display apparatus via a Bluetooth standard. Alternatively, the network information may include information for the mobile terminal to connect to the display apparatus via Wi-Fi direct. Alternatively, the network information may include SSID of an access point for the mobile terminal to connect to the access point connected to the display apparatus.

According to an exemplary embodiment, the network information may include information about a list of communication methods performable by the display apparatus.

Also, according to an exemplary embodiment, the mobile terminal may receive identification information of the short range wireless communication module from the display apparatus via the short range wireless communication. Upon receiving the identification information of the short range wireless communication module, the mobile terminal may transmit information about geomagnetism detected by a geomagnetic sensor included in the mobile terminal so as to transmit information about a direction where the mobile terminal is placed.

Then, the mobile terminal may establish a communication linkage with the display apparatus based on the received network information, in operation S820.

According to an exemplary embodiment, the mobile terminal may receive network information including SSID of an access point or MAC address to connect to the access point connected to the display apparatus, and may establish the communication linkage with the display apparatus by connecting to the access point based on the network information.

According to another exemplary embodiment, the mobile terminal may receive a request to connect to the display apparatus via a Wi-Fi direct method from the display apparatus, or transmit a request to connect to the display apparatus via the Wi-Fi direct method. According to the request transmitted to the display apparatus or received from the display apparatus, the mobile terminal may establish the communication linkage with the display apparatus according to the Wi-Fi direct method.

Then, in operation S830, the mobile terminal may transmit data to be displayed on the display apparatus based on the communication linkage established in operation S820. Here, the data may include information that may be displayed on the display apparatus or the mobile terminal. For example, data may include a photograph, a moving image, or a web page.

According to an exemplary embodiment, the data to be displayed on the display apparatus may be selected according to a state of the mobile terminal. Here, the state of the mobile terminal denotes information about an application being executed in the mobile terminal or a use mode of the mobile terminal. For example, when a video phone application is being executed in the mobile terminal, an execution screen of the video phone application may be transmitted to the display apparatus. Alternatively, when the mobile terminal is in a sleep mode, a list of contents, such as photographs or moving images stored in the mobile terminal, may be transmitted to the display apparatus. Alternatively, when a GUI is displayed on the mobile terminal, a GUI object of the mobile terminal may be transmitted to the display apparatus.

Figure 9:
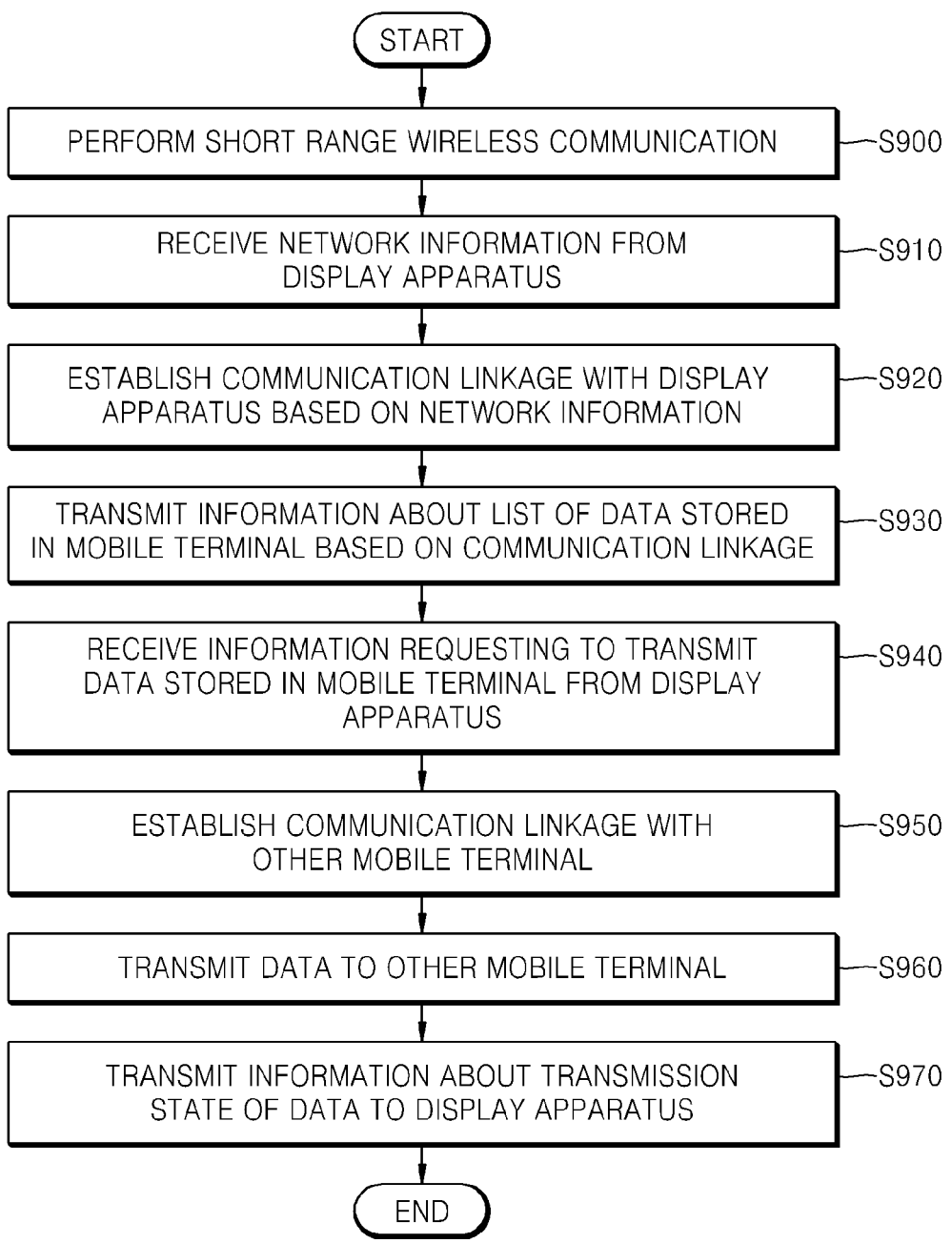
FIG. 9 is a flowchart illustrating a process of transmitting data to another mobile terminal by receiving a request from a display apparatus, by a mobile terminal, according to an exemplary embodiment.

FIG. 9 is a flowchart illustrating a process of transmitting data to another mobile terminal by receiving a request from a display apparatus, by a mobile terminal, according to an exemplary embodiment.

The mobile terminal may perform short range wireless communication with a short range wireless communication module included in the display apparatus, in operation S900. Then, the mobile terminal may receive network information for establishing connection with the display apparatus via a communication method other than the short range wireless communication, from the display apparatus via the short range wireless communication, in operation S910. Then, the mobile terminal may establish a communication linkage with the display apparatus based on the received network information, in operation S920.

Next, in operation S930, the mobile terminal may transmit information about a list of data stored in the mobile terminal, based on the communication linkage established in operation S920.

According to an exemplary embodiment, the information about the list of data stored in the mobile terminal may include a list of contents, such as photographs and moving images, stored in the mobile terminal. Alternatively, the information about the list of data stored in the mobile terminal may include a list of applications installed in the mobile terminal. The information about the list of data stored in the mobile terminal may include a list of other data stored in the mobile terminal.

Also, according to an exemplary embodiment, the information about the list of data stored in the mobile terminal may include additional information about the data in the list. For example, the information about the list of data stored in the mobile terminal may include meta data including a thumbnail image of the data in the list. Alternatively, the information about the list of data stored in the mobile terminal may include a stop image obtained from a frame buffer of the mobile terminal, if the data is a moving image. Alternatively, the information about the list of data stored in the mobile terminal may include an execution icon about an application included in the list.

Then, the mobile terminal may receive information requesting to transmit the data stored in the mobile terminal to another mobile terminal, from the display apparatus, in operation S940.

According to an exemplary embodiment, the information requesting to transmit data to the other mobile terminal may include information for the mobile terminal to establish a communication linkage with the other mobile terminal. The information for the mobile terminal to establish the communication linkage with the other mobile terminal may include information about a communication method supportable by the other mobile terminal, IP information for connecting to the other mobile terminal, information for connecting to the other mobile terminal via a Wi-Fi direct method, or information for performing pairing via a Bluetooth communication method.

Then, the mobile terminal may establish the communication linkage with the other mobile terminal in operation S950. Here, the mobile terminal may establish the communication linkage with the other mobile terminal based on the information received from the display apparatus.

Then, the mobile terminal may transmit the data to the other mobile terminal in operation S960, and may transmit information about a transmission state of the data to the display apparatus in operation S970.

Figure 10:
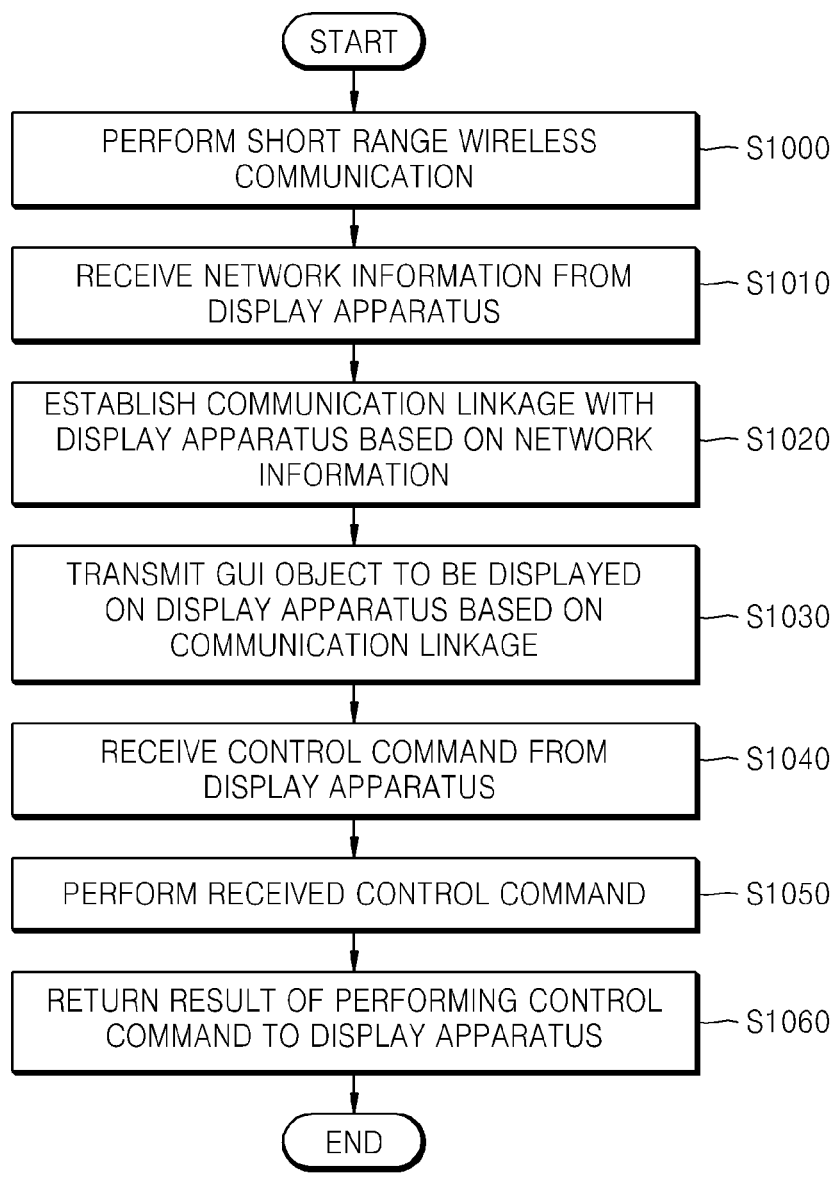
FIG. 10 is a flowchart illustrating a process of transmitting a GUI object for displaying a GUI on a display apparatus and receiving and performing a control command from the display apparatus, by a mobile terminal, according to an exemplary embodiment.

FIG. 10 is a flowchart illustrating a process of transmitting a GUI object for displaying a GUI on a display apparatus and receiving and performing a control command from the display apparatus, by a mobile terminal, according to an exemplary embodiment.

The mobile terminal may perform short range wireless communication with a short range wireless communication module included in the display apparatus, in operation S1000. Then, the mobile terminal may receive network information for establishing a connection with the display apparatus via a communication method other than the short range wireless communication, from the display apparatus via the short range wireless communication, in operation S1010. Then, the mobile terminal may establish a communication linkage with the display apparatus based on the received network information in operation S1020.

Then, in operation S1030, the mobile terminal may transmit a GUI object to be displayed on the display apparatus based on the communication linkage established in operation S1020. Here, the GUI object denotes an object used to display a GUI. Examples of the GUI object include a button, an image, and an icon included in the GUI.

Then, the mobile terminal may receive a control command input through the GUI displayed on the display apparatus from the display apparatus, in operation S1040. The mobile terminal may perform the received control command in operation S1050. For example, the mobile terminal may execute an application installed in the mobile terminal according to the received control command. Alternatively, the mobile terminal may reproduce a moving image stored in the mobile terminal.

Then, the mobile terminal may return the result of performing the control command to the display apparatus in operation S1060. For example, the mobile terminal may transmit an image of an execution screen of an application installed in the mobile terminal to the display apparatus. Alternatively, the mobile terminal may transmit a reproduction screen of a moving image stored in the mobile terminal to the display apparatus.

Figure 11:
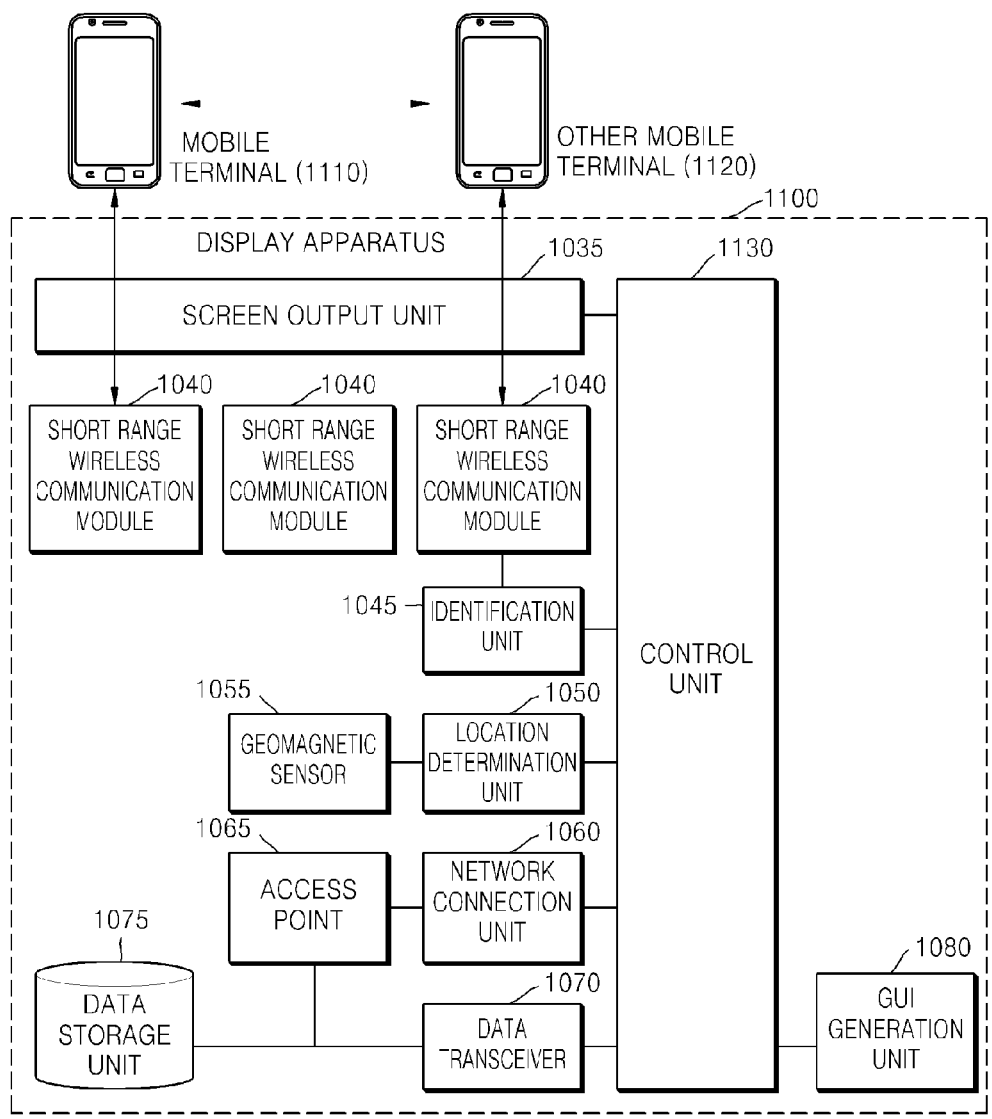
FIG. 11 is a diagram briefly illustrating a structure of a display apparatus, according to an exemplary embodiment.

FIG. 11 is a diagram briefly illustrating a structure of a display apparatus 1100, according to an exemplary embodiment.

The display apparatus 1100 according to an exemplary embodiment may include a screen output unit 1035 for displaying an image on a screen 1300 of the display apparatus 1100, a plurality of short range wireless communication modules 1040 for performing short range wireless communication with a mobile terminal 1110, an identification unit 1045 for identifying the short range wireless communication module 1040 that performed the short range wireless communication with the mobile terminal 1110, a location determination unit 1050 for determining a relative location of the mobile terminal 1110 with respect to the display apparatus 1110 based on the result of identifying by the identification unit 1045, a geomagnetic sensor 1055 for detecting geomagnetism, a network connection unit 1060 for establishing a network connection with the mobile terminal, an access point 1065 included in the display apparatus 1100, a data transceiver 1070 for transmitting and receiving data with the mobile terminal 1110 or another mobile terminal 1120, a data storage unit 1075 for storing data, a GUI generation unit 1080 for generating a GUI, and a control unit 1130 configured as a processor and controlling each unit of the display apparatus 1100.

The screen output unit 1035 may determine a location on the screen 1300 of the display apparatus 1100 to display data according to the relative location determined by the location determination unit 1050, and output data on the screen 1300 of the display apparatus 1100 according to the determined location. For example, when the location determination unit 1050 determines that a location of the mobile terminal 1110 is on a coordinate value (x1, y1), data may be displayed based on a pixel of the screen 1300 corresponding to the coordinate value (x1, y1).

Also, according to an exemplary embodiment, the screen output unit 1035 may display data on the screen 1300 of the display apparatus 1100 while further considering information about the mobile terminal 1110. For example, since a size and a shape of the mobile terminal 1110 may vary according to a type of the mobile terminal 1110, the location to display data may be determined according to the type of the mobile terminal 1110.

Also, according to an exemplary embodiment, while the data is being displayed, the screen output unit 1035 may display a region where the data or GUI is displayed to gradually expand. Detailed examples will be described below with reference to FIGS. 19 and 20.

Also, according to an exemplary embodiment, the screen output unit 1035 may display a list of data stored in the mobile terminal 1110 according to the location determined by the location determination unit 1050.

Also, according to an exemplary embodiment, the screen output unit 1035 may display information about a transmission state of the data received from the mobile terminal 1110.

Also, according to an exemplary embodiment, the screen output unit 1035 may display an execution screen of an application installed in the mobile terminal 1110 and a menu for controlling the application of which the execution screen is displayed.

The short range wireless communication module 1040 may perform short range wireless communication with the mobile terminal 1110. According to an exemplary embodiment, the plurality of short range wireless communication modules 1040 may be arranged in a lattice shape on the rear portion of the screen 1300 as shown in FIG. 13. According to another exemplary embodiment, the plurality of short range wireless communication modules 1040 may be disposed on the front portion of the display apparatus 1100 as shown in FIG. 18. However, FIGS. 13 and 18 illustrate examples for describing the present invention, and the short range wireless communication modules 1040 may be variously arranged to determine the location of the mobile terminal 1110.

Also, the short range wireless communication module 1040 according to an exemplary embodiment may receive information about the mobile terminal 1110 from the mobile terminal 1110. The information about the mobile terminal 1110 may include information about the type of the mobile terminal 1110, and the size and shape of the mobile terminal 1110.

The identification unit 1045 may identify the short range wireless communication module 1040 that performed the short range wireless communication with the mobile terminal 1110 from among the plurality of short range wireless communication modules 1040.

The location determination unit 1050 may determine the relative location of the mobile terminal 1110 with respect to the display apparatus 1100 according to the short range wireless communication module 1040 that performed the short range wireless communication with the mobile terminal 1110 identified by the identification unit 1045.

According to an exemplary embodiment, a table for matching an identification value of the short range wireless communication module 1040 to a coordinate value indicating the location of the mobile terminal 1110 in the screen 1300 of the display apparatus 1100 may be stored in the display apparatus 1100. For example, coordinate values (x1, y1), (x1, y2), (x2, y1), and (x2, y2) may be respectively matched to identification values N1, N2, N3, and N4 set for four short range wireless communication modules. When the display apparatus 1100 obtained the identification value N2 in operation S110 of FIG. 1, the display apparatus 1100 may determine that the mobile terminal 1110 is located at the coordinate value (x1, y2) on the screen 1300 of the display apparatus 1100.

According to an exemplary embodiment, the location determination unit 1050 may determine information about a direction where the mobile terminal 1110 is placed by comparing geomagnetism detected by the geomagnetic sensor 1055 and geomagnetism received from and detected by the mobile terminal 1110.

Also, according to an exemplary embodiment, the relative location may denote a location where the mobile terminal 1110 is placed on the screen 1300 of the display apparatus 1100. For example, when the short range wireless communication modules 1040 are arranged in the lattice shape on the rear portion of the screen 1300 of the display apparatus 1100 as shown in FIG. 13, the mobile terminal 1110 and the short range wireless communication module 1040 may perform short range wireless communication as the mobile terminal 1110 is placed on the screen 1300 of the display apparatus 1100. Accordingly, the display apparatus 1100 may identify the short range wireless communication module 1040 that performed the short range wireless communication with the mobile terminal 1110 to determine the location of the mobile terminal 1110 on the screen 1300 of the display apparatus 1100.

According to another exemplary embodiment, the relative location may denote a location of the mobile terminal 1110 within a predetermined range of the front portion of the display apparatus 1100. For example, when the short range wireless communication modules 1040 are disposed on the front portion of the display apparatus 1100 as shown in FIG. 18, the mobile terminal 1110 and the short range wireless communication module 1040 may perform short range wireless communication as the mobile terminal 1110 is placed within the predetermined range of the front portion of the display apparatus 1100. Accordingly, the display apparatus 1100 may identify the wireless communication module 1040 that performed the short range wireless communication with the mobile terminal 1110 to determine the location of the mobile terminal 1110 on the screen 1300 of the display apparatus 1100.

The geomagnetic sensor 1055 may detect geomagnetism of the location where the display apparatus 1100 is located.

The network connection unit 1060 may establish a communication linkage with the mobile terminal 1110 in a communication method other than the short range wireless communication.

According to an exemplary embodiment, as the short range wireless communication module 1040 and the mobile terminal 1110 perform the short range wireless communication, the network connection unit 1060 may transmit network information for establishing a communication linkage with the mobile terminal 1110 to the mobile terminal 1110 in the communication method other than the short range wireless communication, and establish the communication linkage with the mobile terminal 1110 according to the transmitted network information.

Also, according to an exemplary embodiment, the network connection unit 1060 may connect to the mobile terminal 1110 via the access point 1065 included in the display apparatus 1100. According to another exemplary embodiment, the network connection unit 1060 may establish the communication linkage with the mobile terminal 1110 by using a Wi-Fi direct method.

The access point 1065 may be included in the display apparatus 1100 to connect the mobile terminal 1110 and the display apparatus 1100.

According to an exemplary embodiment, the data transceiver 1070 may transmit data stored in the data storage unit 1075 to the mobile terminal 1110 or the other mobile terminal 1120. Also, the data transceiver 1070 may receive data to be displayed on the display apparatus 1100 from the mobile terminal 1110.

According to an exemplary embodiment, the data transceiver 1070 may receive information about the mobile terminal 1110.

Also, according to an exemplary embodiment, the data transceiver 1070 may receive information about a list of data stored in the mobile terminal 1110 from the mobile terminal 1110.

Also, according to an exemplary embodiment, the data transceiver 1070 may transmit information about requesting to transmit the data stored in the mobile terminal 1110 to the other mobile terminal 1120 that is connected to the display apparatus 1100, to the mobile terminal 1110. Also, the data transceiver 1070 may receive information about a transmission state of the data from the mobile terminal 1110.

Also, according to an exemplary embodiment, the data transceiver 1070 may receive information about an application installed in the mobile terminal 1110 from the mobile terminal 1110.

According to an exemplary embodiment, the data storage unit 1075 may include a cache. The data received from the mobile terminal 1110 may be stored in the cache of the data storage unit 1075, and the stored data may be transmitted to the other mobile terminal 1120.

According to an exemplary embodiment, the GUI generation unit 1080 may generate a GUI including a GUI received by using a GUI object received through the data transceiver 1070. Here, the generated GUI may not only include a GUI currently displayed on the mobile terminal 1110, but also a GUI that is not displayed. The GUI generated by the GUI generation unit 1080 may be displayed on the screen 1300 according to the location of the mobile terminal 1110 determined by the location determination unit 1050 via the screen output unit 1035.

Here, the data transceiver 1070 may transmit control information input through the GUI displayed on the screen 1300 of the display apparatus 1100 to the mobile terminal 1110.

Also, according to an exemplary embodiment, the screen 1300 of the display apparatus 1100 may be configured to be capable of an input. For example, the screen 1300 may be configured to be capable of an input and an output, such as a touch screen.

Also, according to an exemplary embodiment, the location determination unit 1050 may compare the location of the mobile terminal 1110 and a region where the data is displayed on the screen 1300 of the display apparatus 1100. The location determination unit 1050 may determine whether the mobile terminal 1110 is located on the region according to the result of comparing. If it is determined that the mobile terminal 1110 is located on the region of the screen 1300, the data displayed on the screen 1300 may be transmitted to the mobile terminal 1110. This will be described in detail below with reference to FIG. 17.

Figure 12:
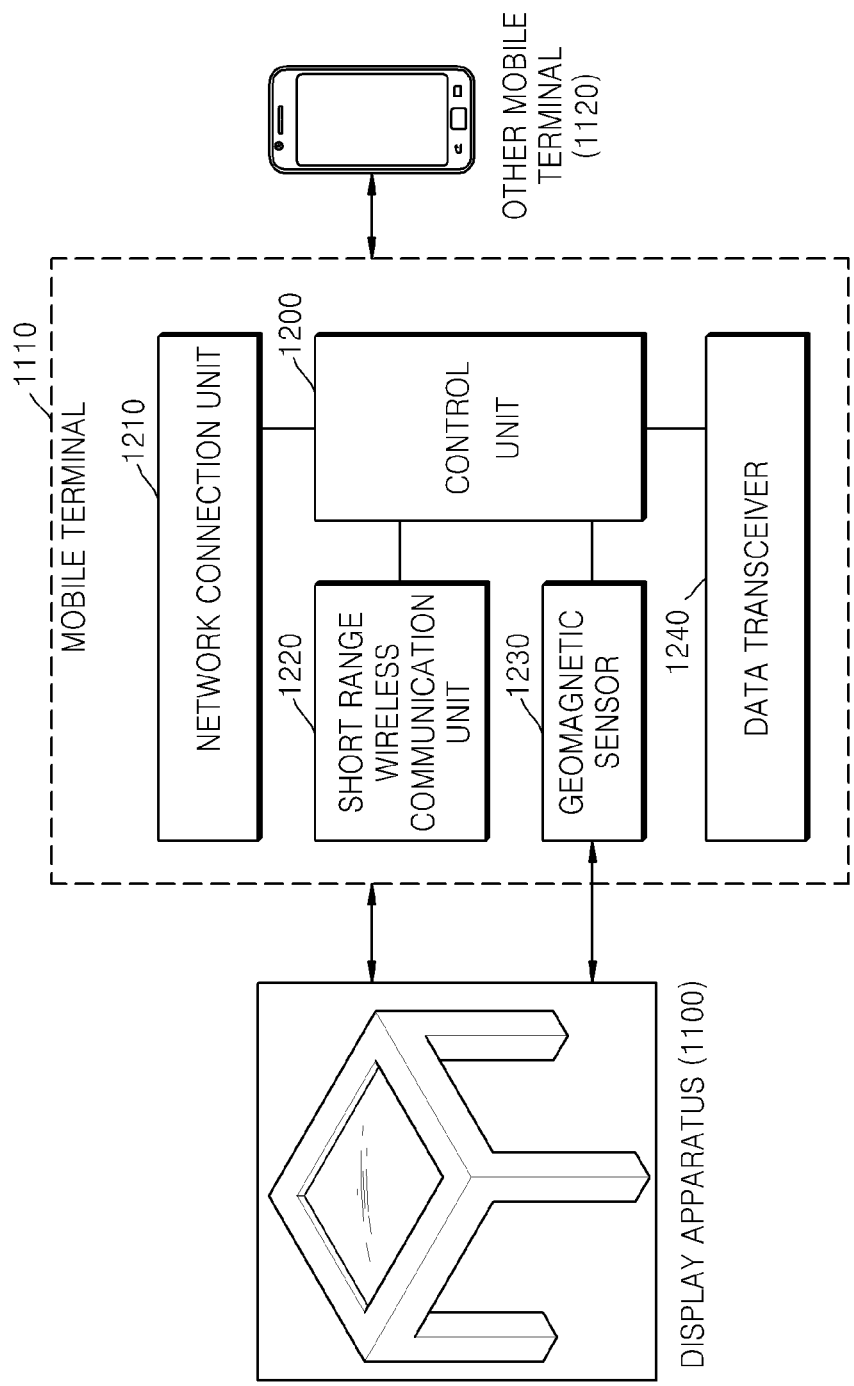
FIG. 12 is a diagram briefly illustrating a structure of a mobile terminal, according to an exemplary embodiment.

FIG. 12 is a diagram briefly illustrating a structure of the mobile terminal 1110, according to an exemplary embodiment.

The mobile terminal 1110 according to an exemplary embodiment may include a short range wireless communication unit 1220 for performing short range wireless communication with the display apparatus 1100, a network connection unit 1210 for establishing a communication linkage with the display apparatus 1100 or the other mobile terminal 1120, a geomagnetic sensor 1230 for detecting geomagnetism, a data transceiver 1240 for transmitting and receiving data to the display apparatus 1100 or the other mobile terminal 1120, and a control unit 1200 for controlling each unit of the mobile terminal 1110.

The short range wireless communication unit 1220 according to an exemplary embodiment may receive network information from the display apparatus 1100 via short range wireless communication. Here, the network information may be information for the mobile terminal 1110 to connect to the display apparatus 1100. For example, the network information may include information for pairing the mobile terminal 1110 and the display apparatus 1100 via the Bluetooth standard. Alternatively, the network information may include information for the mobile terminal 1110 to connect to the display apparatus 1100 via a Wi-Fi direct method. Alternatively, the network information may include an SSID of an access point for connecting the mobile terminal 1110 to the access point connected to the display apparatus 1100. Also, according to an exemplary embodiment, the network information may include information about a list of communication methods performable by the display apparatus 1100.

The network connection unit 1210 according to an exemplary embodiment may establish a communication linkage with the display apparatus 1100 by using a communication method other than short range wireless communication as the network information is received through the short range wireless communication. For example, the network connection unit 1210 may connect to the access point connected to the display apparatus 1100 or directly connect to the display apparatus 1100 via the Wi-Fi direct method, according to the network information.

The data transceiver 1240 according to an embodiment may transmit the data to be displayed on the display apparatus 1100 to the display apparatus 1100 by using the communication linkage established by the network connection unit 1210.

Also, the data transceiver 1240 according to an exemplary embodiment may determine data to be transmitted to the display apparatus 1100 according to a state of the mobile terminal 1110. Here, the state of the mobile terminal 1110 denotes information about an application being executed in the mobile terminal 1110 or a use mode of the mobile terminal 1110. For example, when a video phone application is being executed by the mobile terminal 1110, an execution screen of the video phone application may be transmitted to the display apparatus 1100. Alternatively, when the mobile terminal 1110 is in a sleep mode, a list of contents, such as photographs or moving images, stored in the mobile terminal 1110 may be transmitted to the display apparatus 1100. Alternatively, when a GUI is displayed on the mobile terminal 1110, a GUI object of the mobile terminal 1110 may be transmitted to the display apparatus 1100.

Also, the data transceiver 1240 according to an exemplary embodiment may transmit information about geomagnetism detected by the geomagnetic sensor 1230 to the display apparatus 1100 so as to transmit information about a direction where the mobile terminal 1110 is placed to the display apparatus 1100.

Also, the data transceiver 1240 according to an exemplary embodiment may receive a control command from the display apparatus 1100 and transmit the result of receiving the control command to the display apparatus 1100.

The control unit 1200 according to an exemplary embodiment may control the mobile terminal 1110 according to the received control command and return the result of performing the control command to the display apparatus 1100 through the data transceiver 1240.

FIG. 13 is a diagram briefly illustrating a structure of the display apparatus 1100 and the short range wireless communication mobile 1040, according to an exemplary embodiment.

In the display apparatus 1100 according to an exemplary embodiment, the plurality of short range wireless communication mobiles 1040 may be arranged in the lattice shape on the rear portion of the screen 1300. Intervals between the short range wireless communication modules 1040 may be determined considering a communicable distance of short range wireless communication.

FIG. 14 is a diagram of the screen 1300 of the display apparatus 1100 displaying a GUI 1400 according to a location of a mobile terminal 1110, according to an exemplary embodiment.

According to an exemplary embodiment, when the mobile terminal 1110 is placed on the screen 1300 of the display apparatus 1100 in status 1410, a GUI object is transmitted from the mobile terminal 1110 to the display apparatus 1100, and the display apparatus 1100 may display the GUI 1400 including the GUI object on the screen 1300 in status 1420.

Figure 15:
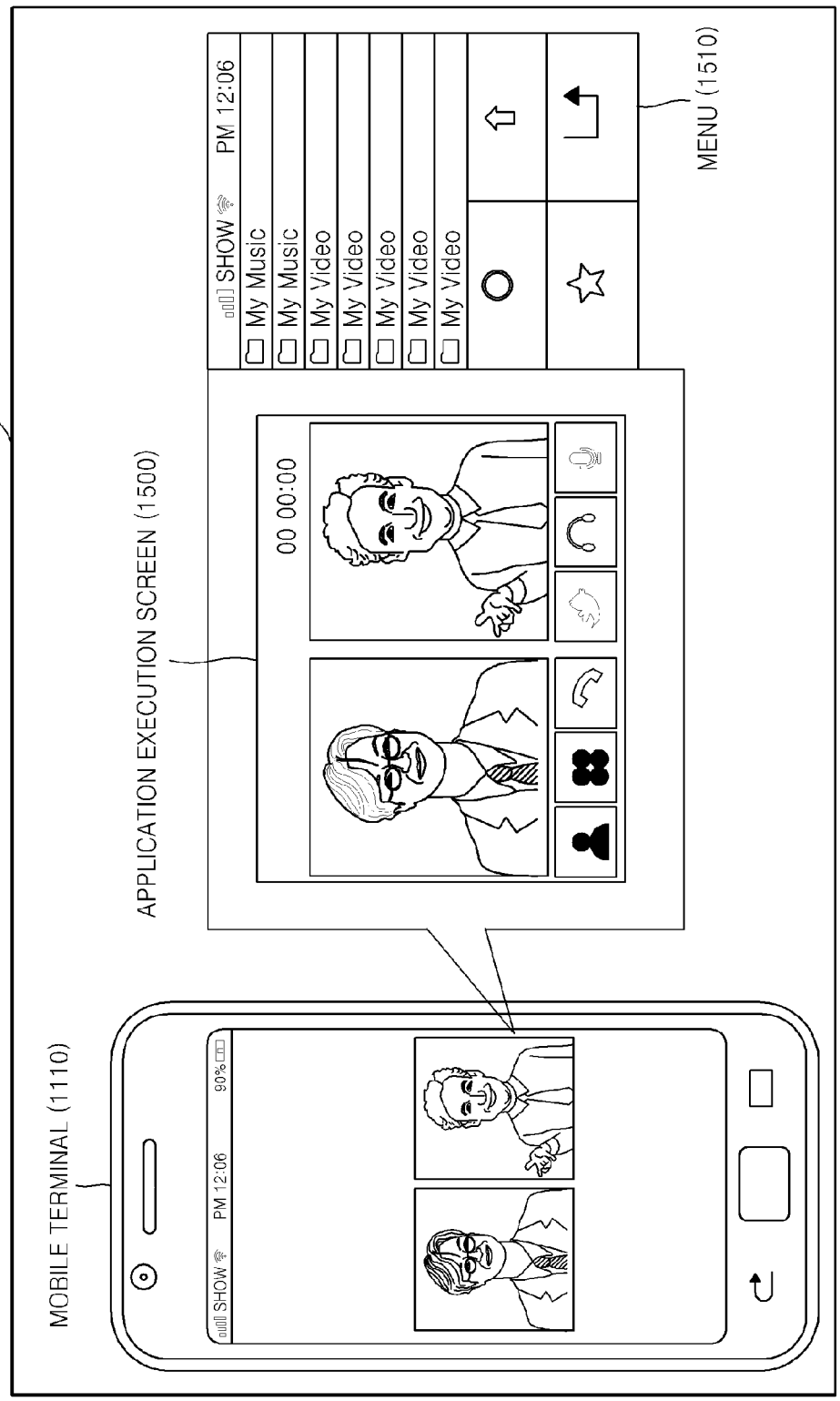
FIG. 15 is a diagram of a screen of a display apparatus displaying an application execution screen and a menu for controlling an application being executed in a mobile terminal, according to an exemplary embodiment.

FIG. 15 is a diagram of the screen 1300 of the display apparatus 1100 displaying an application execution screen 1500 and a menu 1510 for controlling an application being executed in the mobile terminal 1110, according to an exemplary embodiment.

According to an exemplary embodiment, when the mobile terminal 1110 is placed on the screen 1300 of the display apparatus 1100 while executing an application, the mobile terminal 1110 may transmit information about an application installed in the mobile terminal 1110, which includes information about the application execution screen 1500, to the display apparatus 1100, and the display apparatus 1100 may display the application execution screen 1500 and the menu 1510 for controlling the application.

FIG. 16 is a diagram of the screen 1300 of the display apparatus 1100 displayed during a process of displaying a list 1610 of data stored in the mobile terminal 1110 on the screen 1300 of the display apparatus 1100 and controlling the mobile terminal 1110 to share the list 1610 of data stored in the mobile terminal 1110 with the other mobile terminal 1120, by the display apparatus 1100, according to an exemplary embodiment.

According to an exemplary embodiment, when the mobile terminal 1110 and the other mobile terminal 1120 are placed on the screen 1300 of the display apparatus 1100, the lists 1610 of data stored in the mobile terminal 1110 and the other mobile terminal 1120 may be displayed in status 1620. Here, a location of the lists 1610 may be determined according to locations of the mobile terminal 1110 and the other mobile terminal 1120.

According to an exemplary embodiment, data to be shared may be selected through the displayed lists 1610 in status 1630. For example, as in status 1630, one piece of data may be selected from the list 1610 of the data stored in the mobile terminal 1110 and dragged to a location of the other mobile terminal 1120 on the screen 1300 to select the data to be shared and the other mobile terminal 1120 to share the data. Alternatively, one piece of data may be selected from the list 1610 and the other mobile terminal 1120 to receive the data may transmit a data transmission request to the display apparatus 1100 to select the data to be shared and the other mobile terminal 1120 to share the data.

According to an exemplary embodiment, the display apparatus 1100 may receive information about a transmission state 1650 of the data from the mobile terminal 1110, and information about the transmission state 1650 may be displayed on the screen 1300 in status 1640.

FIG. 17 is a diagram for describing a process of transmitting content displayed on the screen 1300 of the display apparatus 1100 to the mobile terminal 1110, by the display apparatus 1100, according to an exemplary embodiment.

The display apparatus 1100 may display data on a predetermined region 1740 of the screen 1300 in status 1700. Here, the data displayed on the screen 1300 may be data displayable on the screen 1300, such as data stored in the display apparatus 1100 or a web page. For example, the data stored in the display apparatus 1100 may be a photograph or a moving image.

According to an exemplary embodiment, when the mobile terminal 1110 is placed on the predetermined region 1740 of the screen 1300 where the data is displayed in status 1710, the location of the mobile terminal 1110 is determined by using short range wireless communication. When it is determined that the location of the mobile terminal 1110 is included in the predetermined region of the screen 1300 where the data is displayed, the data displayed on the screen 1300 may be transmitted to the mobile terminal 1110 in status 1720. Here, if the data displayed on the screen 1300 is a web page, uniform resource locator (URL) information for connecting to the web page may be transmitted to the mobile terminal 1110.

Also, according to an exemplary embodiment, the display apparatus 1100 may receive information about the data stored in the mobile terminal 1110, and display the received data on the screen 1300 in status 1730.

FIG. 18 is a diagram of a structure of the display apparatus 1100 and the short range wireless communication module 1040, according to another exemplary embodiment.

In the display apparatus 1100 according to an exemplary embodiment, the short range wireless communication modules 1040 may be disposed in a line on the front portion of the display apparatus 1100.

Figure 19:
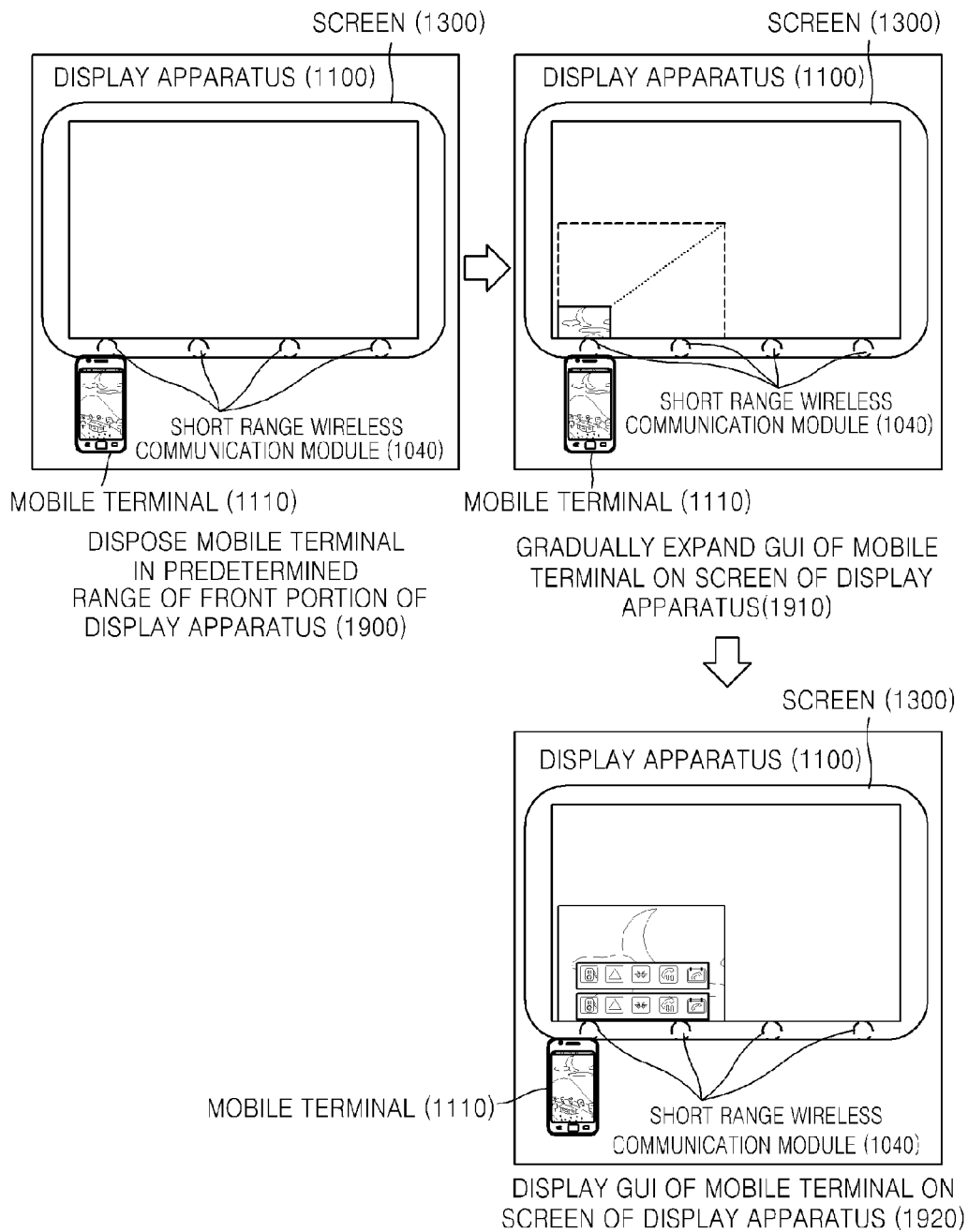
FIG. 19 is a diagram for describing a process of displaying a GUI of a mobile terminal on a screen of a display apparatus, according to an exemplary embodiment.

FIG. 19 is a diagram for describing a process of displaying a GUI of the mobile terminal 1110 on the screen 1300 of the display apparatus 1100, according to an exemplary embodiment.

When the mobile terminal 1110 is placed on a predetermined range of the front portion of the display apparatus 1100, short range wireless communication may be performed through the short range wireless communication module 1040 in status 1900.

According to an exemplary embodiment, the display apparatus 1100 may gradually expand a region where the GUI of the mobile terminal 1110 is displayed from a location of the screen 1300 corresponding to the short range wireless communication module 1040 that performed the short range wireless communication, in status 1910.

According to an exemplary embodiment, the display apparatus 1100 may display a GUI including a GUI object received from the mobile terminal 1110 on the expanded region of the screen 1300 in status 1920.

Figure 20:
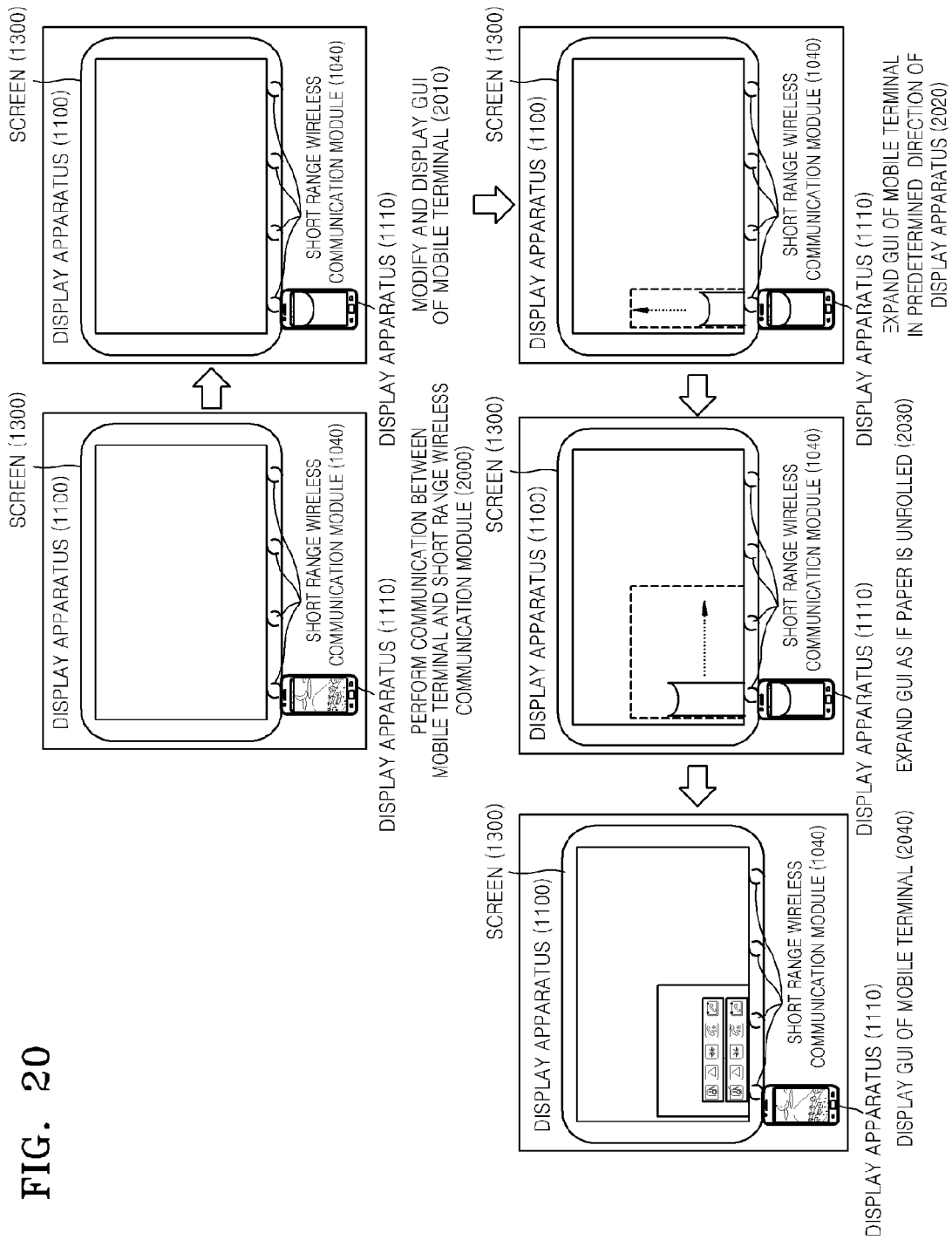
FIG. 20 is a diagram for describing a process of displaying a GUI of a mobile terminal on a screen of a display apparatus, according to another exemplary embodiment.

FIG. 20 is a diagram for describing a process of displaying a GUI of the mobile terminal 1110 on the screen 1300 of the display apparatus 1100, according to another exemplary embodiment.

When the mobile terminal 1110 is placed on a predetermined region of the front portion of the display apparatus 1100, short range wireless communication may be performed via the short range wireless communication module in status 2000.

According to an exemplary embodiment, as the short range wireless communication is performed between the display apparatus 1100 and the mobile terminal 1110, the mobile terminal 1110 may modify and display a GUI in status 2010. When the GUI of the mobile terminal 1110 is modified as if a paper is rolled up, the modified GUI may be expanded and displayed on the display apparatus 1100 in status 2020. The modified GUI may be expanded as if the paper is unrolled in status 2030. After status 2030, the GUI of the mobile terminal 1110 may be displayed on the mobile terminal 1110 and the display apparatus 1100 in status 2040.

Figure 21:
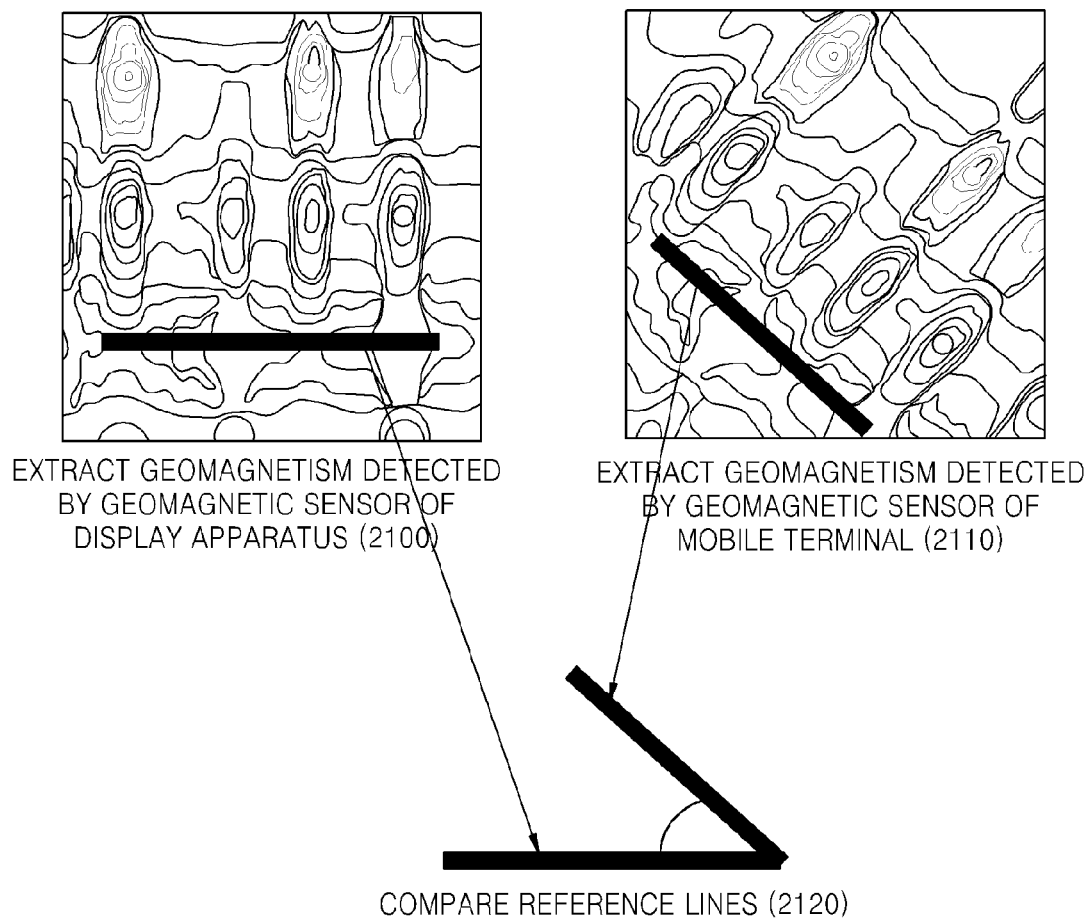
FIG. 21 is a diagram for describing a method of comparing geomagnetism detected by a geomagnetic sensor of a display apparatus and a geomagnetism detected by a geomagnetic sensor of a mobile terminal, according to an exemplary embodiment.

FIG. 21 is a diagram for describing a method of comparing geomagnetism detected by a geomagnetic sensor of a display apparatus and a geomagnetism detected by a geomagnetic sensor of a mobile terminal, according to an exemplary embodiment.

According to an exemplary embodiment, reference lines indicating directivities of the geomagnetism detected by the geomagnetic sensor of the display apparatus 2100 and the geomagnetism detected by the geomagnetic sensor of the mobile terminal 2110 may be extracted. The display apparatus may determine a direction where the mobile terminal is placed according to an angle of the extracted reference lines.

An exemplary embodiment may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. For example, each element described as a single type may be distributed, and similarly, elements described to be distributed may be combined.

The scope of the inventive concept is defined not by the detailed description of the exemplary embodiments but by the appended claims, and all differences within the scope will be construed as being included in the inventive concept.

What is claimed is:

1. A method of controlling a display apparatus comprising a plurality of short range wireless communication modules, the method comprising:
   performing short range wireless communication with a mobile terminal through a short range wireless communication module included in the display apparatus;
   identifying the short range wireless communication module performing the short range wireless communication with the mobile terminal from among the plurality of short range wireless communication modules;
   determining a relative location of the mobile terminal with respect to the display apparatus according to the result of identifying; and
   determining a location on a screen of the display apparatus to display data according to the relative location and displaying the data on the screen of the display apparatus according to the determined location.

2. The method of claim 1, wherein the relative location is a location where the mobile terminal is placed on the screen of the display apparatus.

3. The method of claim 1, wherein the relative location is a location where the mobile terminal is placed within a predetermined range of a front portion of the display apparatus.

4. The method of claim 1, further comprising receiving data to be displayed on the display apparatus from the mobile terminal.

5. The method of claim 4, further comprising receiving information about the mobile terminal via the short range wireless communication, wherein the displaying of the data on the screen of the display apparatus comprises displaying the data on the screen of the display apparatus while further considering the information about the mobile terminal.

6. The method of claim 4, wherein the data comprises a graphic user interface (GUI) object of the mobile terminal, and
the displaying of the data on the screen of the display apparatus comprises displaying a GUI including the GUI object according to the relative location of the mobile terminal with respect to the display apparatus.

7. The method of claim 6, wherein the displaying of the data on the screen of the display apparatus comprises gradually expanding a region where the GUI is displayed from the relative location of the mobile terminal with respect to the display apparatus.

8. The method of claim 6, further comprising transmitting a control command input through the GUI displayed on the display apparatus to the mobile terminal through the short range wireless communication.

9. The method of claim 1, wherein the performing of the short range wireless communication with the mobile terminal comprises transmitting network information for connecting the mobile terminal and the display apparatus via a communication method other than the short range wireless communication to the mobile terminal, and
the method further comprises connecting to the mobile terminal via the other communication method by using the network information.

10. The method of claim 9, wherein the connecting to the mobile terminal via the other communication method comprises connecting to the mobile terminal through an access point included in the display apparatus.

11. The method of claim 9, wherein the connecting to the mobile terminal via the other communication method comprises:
receiving a communication connection request according to the transmitted network information from the mobile terminal; and
connecting to the mobile terminal by using a wireless fidelity (Wi-Fi) direct communication method according to the received communication connection request.

12. The method of claim 9, further comprising:
receiving information about a list of data stored in the mobile terminal from the mobile terminal; and
displaying the received information about the list on the screen of the display apparatus according to the determined relative location.

13. The method of claim 9, further comprising:
receiving data through the other communication method from the mobile terminal; and
storing the received data.

14. The method of claim 9, further comprising transmitting the data stored in the display apparatus to the mobile terminal via the other communication method.

15. The method of claim 9, further comprising:
transmitting information about requesting to transmit the data stored in the mobile terminal to another mobile terminal connected to the display apparatus, to the mobile terminal;
receiving information about a transmission state of the data from the mobile terminal; and
displaying the received information about the transmission state on the screen of the display apparatus.

16. The method of claim 9, further comprising receiving information about an application installed in the mobile terminal from the mobile terminal, wherein the displaying of the data comprises:
displaying an execution screen of the application installed in the mobile terminal on the screen of the display apparatus; and
displaying a menu about the application of which the execution screen is displayed on the screen, on the screen of the display apparatus.

17. The method of claim 9, further comprising:
displaying data on the screen of the display apparatus;
comparing the relative location of the mobile terminal with respect to the display apparatus and a region where the data is displayed on the screen of the display apparatus; and
transmitting the data to the mobile terminal, when the relative location of the mobile terminal is included in the region where the data is displayed based on the result of comparing.

18. The method of claim 1, wherein the determining of the relative location comprises:
receiving information about geomagnetism detected by a geomagnetic sensor included in the mobile terminal from the mobile terminal;
comparing the received information about geomagnetism and information about geomagnetism detected by a geomagnetic sensor included in the display apparatus; and
determining the relative location by detecting a relative angle of the mobile terminal with respect to a predetermined reference line of the display apparatus, based on the result of comparing.

19. A non-transitory computer-readable recording medium having recorded thereon a program for executing the method of claim 1.

20. A method of controlling a mobile terminal comprising a short range wireless communication module, the method comprising:
performing short range wireless communication with a display apparatus through the short range wireless communication module included in the mobile terminal;
receiving network information which is used for connecting to the display apparatus via a communication method other than the short range wireless communication from the display apparatus via the short range wireless communication, wherein the network information includes a list of communication methods performable by the display apparatus;
connecting to the display apparatus by using the communication method based on the received network information, wherein the communication method is selected from the communication methods performable by the display apparatus; and
transmitting data to be displayed on the display apparatus based on the connection.

21. The method of claim 20, wherein the connecting to the display apparatus comprises connecting to the display apparatus by connecting to an access point included in the display apparatus.

22. The method of claim 20, wherein the connecting to the display apparatus comprises connecting to the display apparatus by using a wireless fidelity (Wi-Fi) direct communication method by using the network information.

23. The method of claim 20, wherein the data to be displayed comprises information about a list of data stored in the mobile terminal.

24. The method of claim 23, further comprising:
receiving information about requesting to transmit data included in the list of data stored in the mobile terminal to another mobile terminal, and information for linking communication with the other mobile terminal, from the display apparatus;
linking communication with the other mobile terminal based on the information for linking communication with the other mobile terminal;
transmitting the data to the other mobile terminal; and
transmitting information about a transmission state of the data to the display apparatus.

25. The method of claim 20, wherein the data to be displayed comprises information about a graphic user interface (GUI) object of the mobile terminal.

26. The method of claim 25, further comprising:
receiving a control command from the display apparatus;
performing the received control command; and
returning the result of performing the control command to the display apparatus.

27. The method of claim 20, further comprising determining data to be transmitted to the display apparatus according to a state of the mobile terminal.

28. The method of claim 20, further comprising:
receiving identification information of the short range wireless communication module included in the display apparatus via the short range wireless communication from the display apparatus; and
upon receiving the identification information, transmitting information about geomagnetism detected by a geomagnetic sensor included in the mobile terminal to the display apparatus.

29. A display apparatus capable of communication, the display apparatus comprising:
a plurality of short range wireless communication modules capable of short range wireless communication with a mobile terminal;
an identification unit for identifying a short range wireless communication module performing short range wireless communication with the mobile terminal from among the plurality of short range wireless communication modules;
a location determination unit for determining a relative location of the mobile terminal with respect to the display apparatus according to the result of identifying by the identification unit; and
a screen output unit for determining a location to display data to be displayed on the screen of the display apparatus according to the relative location determined by the location determination unit, and displaying the data on the screen of the display apparatus according to the determined location.

30. The display apparatus of claim 29, wherein the relative location is a location where the mobile terminal is placed on the screen of the display apparatus.

31. The display apparatus of claim 29, wherein the relative location is a location where the mobile terminal is placed within a predetermined range of a front portion of the display apparatus.

32. The display apparatus of claim 29, further comprising a data transceiver for receiving the data to be displayed from the mobile terminal.

33. The display apparatus of claim 32, wherein the data transceiver receives information about the mobile terminal via the short range wireless communication, and the screen output unit displays the data on the screen of the display apparatus while further considering the information about the mobile terminal.

34. The display apparatus of claim 32, wherein the data comprises a graphic user interface (GUI) object of the mobile terminal,
the display apparatus further comprises a GUI generation unit for generating a GUI comprising the GUI object, and
the screen output unit displays the generated GUI comprising the GUI object according to the relative location of the mobile terminal with respect to the display apparatus.

35. The display apparatus of claim 34, wherein the screen output unit gradually expands a region where the GUI is displayed from the relative location of the mobile terminal with respect to the display apparatus.

36. The display apparatus of claim 35, wherein the data transceiver transmits a control command input through the GUI displayed on the display apparatus to the mobile terminal through the short range wireless communication.

37. The display apparatus of claim 29, further comprising a network connection unit for transmitting network information for connecting the mobile terminal and the display apparatus to the mobile terminal through the short range wireless communication module by using a communication method other than the short range wireless communication, and connecting to the mobile terminal by using the other communication method using the network information.

38. The display apparatus of claim 37, wherein the network connection unit connects to the mobile terminal through an access point included in the display apparatus.

39. The display apparatus of claim 37, wherein the network connection unit connects to the mobile terminal by using a wireless fidelity (Wi-Fi) direct communication method.

40. The display apparatus of claim 37, further comprising:
a data transceiver for receiving data from the mobile terminal; and
a data storage unit for storing the received data.

41. The display apparatus of claim 37, further comprising:
a data storage unit for storing data; and
a data transceiver for transmitting the data stored in the data storage unit to the mobile terminal by using a communication method connected through the network connection unit.

42. The display apparatus of claim 37, further comprising a data transceiver for receiving information about a list of data stored in the mobile terminal from the mobile terminal,
wherein the screen output unit displays the received list on the screen of the display apparatus according to the relative location.

43. The display apparatus of claim 37, further comprising a data transceiver for transmitting information about requesting to transmit data stored in the mobile terminal to another mobile terminal connected to the display apparatus, and receiving information about a transmission state of the data from the mobile terminal,
wherein the screen output unit displays the information about the transmission state on the screen of the display apparatus.

44. The display apparatus of claim 37, further comprising a data transceiver for receiving information about an application installed in the mobile terminal from the mobile terminal,
wherein the screen output unit displays an execution screen of the application installed in the mobile terminal and a menu about the application of which the execution screen is displayed on the screen, according to the relative location of the mobile terminal.

45. The display apparatus of claim 37, wherein the screen output unit displays data on the screen of the display apparatus,
the location determination unit compares the relative location of the mobile terminal and a region where the data is displayed on the screen of the display apparatus, and
the display apparatus further comprises a data transceiver for transmitting the data to the mobile terminal when the relative location of the mobile terminal is included in the region where the data is displayed based on the result of comparing by the location determination unit.

46. The display apparatus of claim 29, wherein at least one of the short range wireless communication modules receives information about geomagnetism detected by a geomagnetic sensor included in the mobile terminal from the mobile terminal, and
the location determination unit determines the relative location while further considering the result of comparing the received information about geomagnetism and information about geomagnetism detected by a geomagnetic sensor included in the display apparatus.

47. The display apparatus of claim 29, wherein the plurality of short range wireless communication modules are arranged in a lattice shape on a rear portion of the screen of the display apparatus.

48. A mobile terminal comprising a short range wireless communication module, the mobile terminal comprising:
a short range wireless communication unit for receiving network information which is used for connecting to the display apparatus via a communication method other than the short range wireless communication from a display apparatus through the short range wireless communication module included in the mobile terminal, wherein the network information includes a list of communication methods performable by the display apparatus;
a network connection unit for connecting to the display apparatus by using the communication method based on the received network information, wherein the communication method is selected from the communication methods performable by the display apparatus; and
a data transceiver for transmitting data to be displayed on the display apparatus based on the connection.

49. The mobile terminal of claim 48, wherein the network connection unit connects to the display apparatus by connecting to an access point included in the display apparatus.

50. The mobile terminal of claim 48, wherein the network connection unit connects to the display apparatus via a wireless fidelity (Wi-Fi) direct communication method by using the network information.

51. The mobile terminal of claim 49, wherein the data to be displayed comprises information about a list of data stored in the mobile terminal.

52. The mobile terminal of claim 48, wherein the data to be displayed comprises information about a graphic user interface (GUI) object of the mobile terminal.

53. The mobile terminal of claim 52, wherein the data transceiver receives a control command from the display apparatus, and
the mobile terminal further comprises a control unit for controlling the mobile terminal according to the received control command and returning the result of performing the control command to the display apparatus.

54. The mobile terminal of claim 48, wherein the data transceiver determines data to be transmitted to the display apparatus according to a state of the mobile terminal.

55. The mobile terminal of claim 48, further comprising a geomagnetic sensor for generating information about geomagnetism via detection,
wherein the short range wireless communication unit transmits the information about the geomagnetism to the display apparatus through the short range wireless communication.

56. A method of controlling a mobile terminal comprising a short range wireless communication module, the method comprising:
performing short range wireless communication with a display apparatus through the short range wireless communication module included in the mobile terminal;
determining a relative location of the mobile terminal with respect to the display apparatus according to the short range wireless communication;
receiving network information which is used for connecting to the display apparatus via a communication method other than the short range wireless communication from the display apparatus via the short range wireless communication;
connecting to the display apparatus by using the communication method based on the received network information; and
determining a location on a screen of the display apparatus to display data according to the relative location and transmitting data, which is generated based on the determined location, to be displayed on the display apparatus based on the connection.

* * * * *